Nov. 16, 1948.  G. A. CHADWICK ET AL  2,453,830
MACHINE GUN
Filed Dec. 21, 1932  15 Sheets-Sheet 2
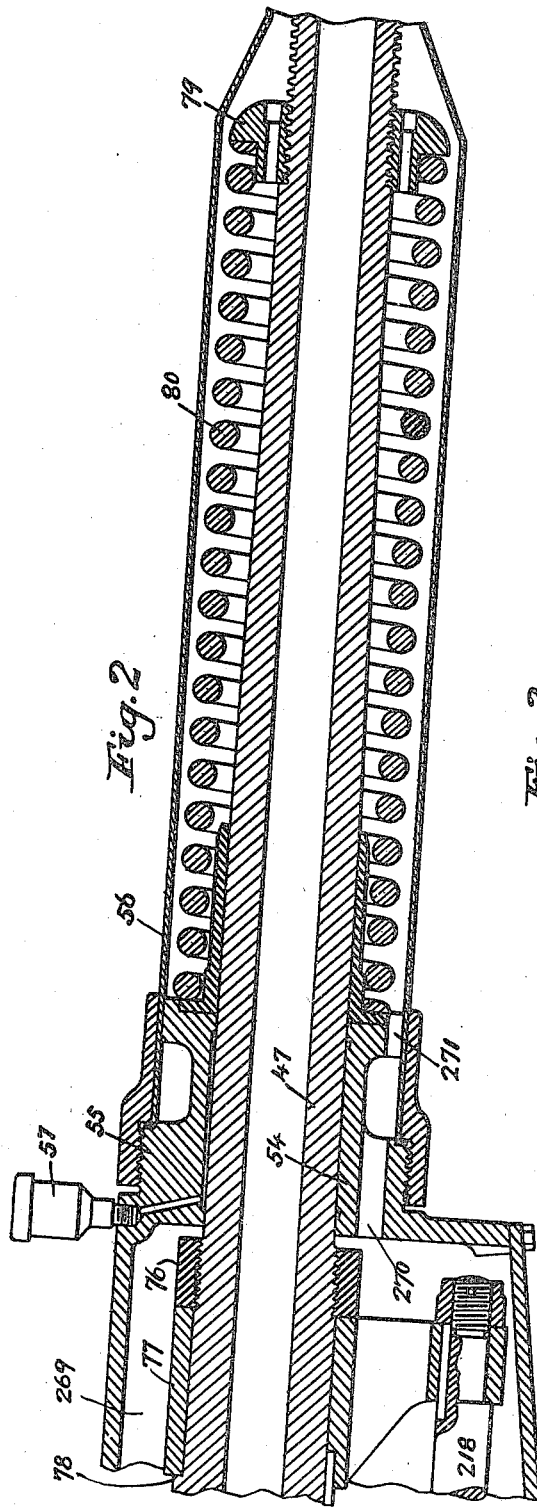
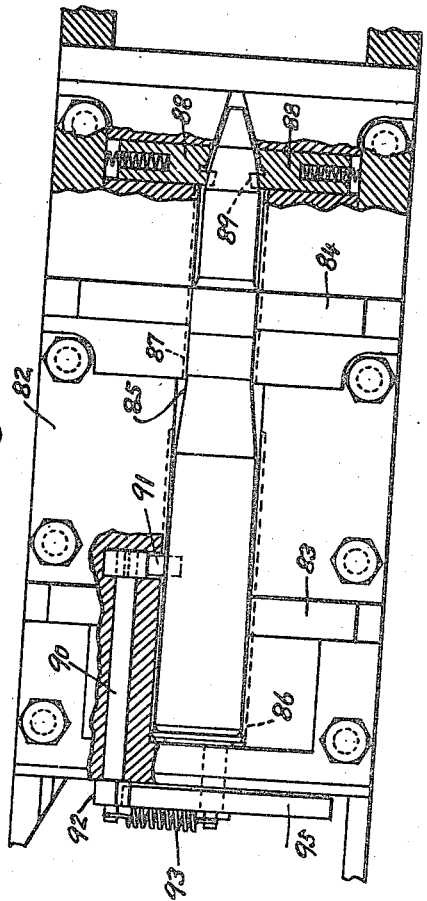
Inventors:
George A. Chadwick
Paul W. Brok
by Robert A. [Attorney signature]
Attorney.

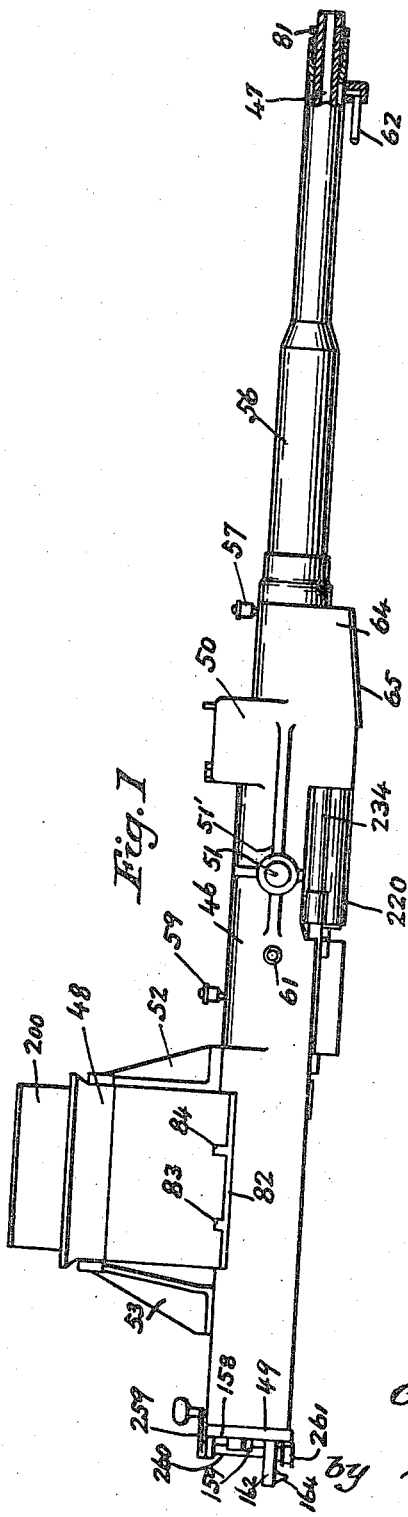

Nov. 16, 1948.　　　G. A. CHADWICK ET AL　　　2,453,830
MACHINE GUN
Filed Dec. 21, 1932
15 Sheets-Sheet 3
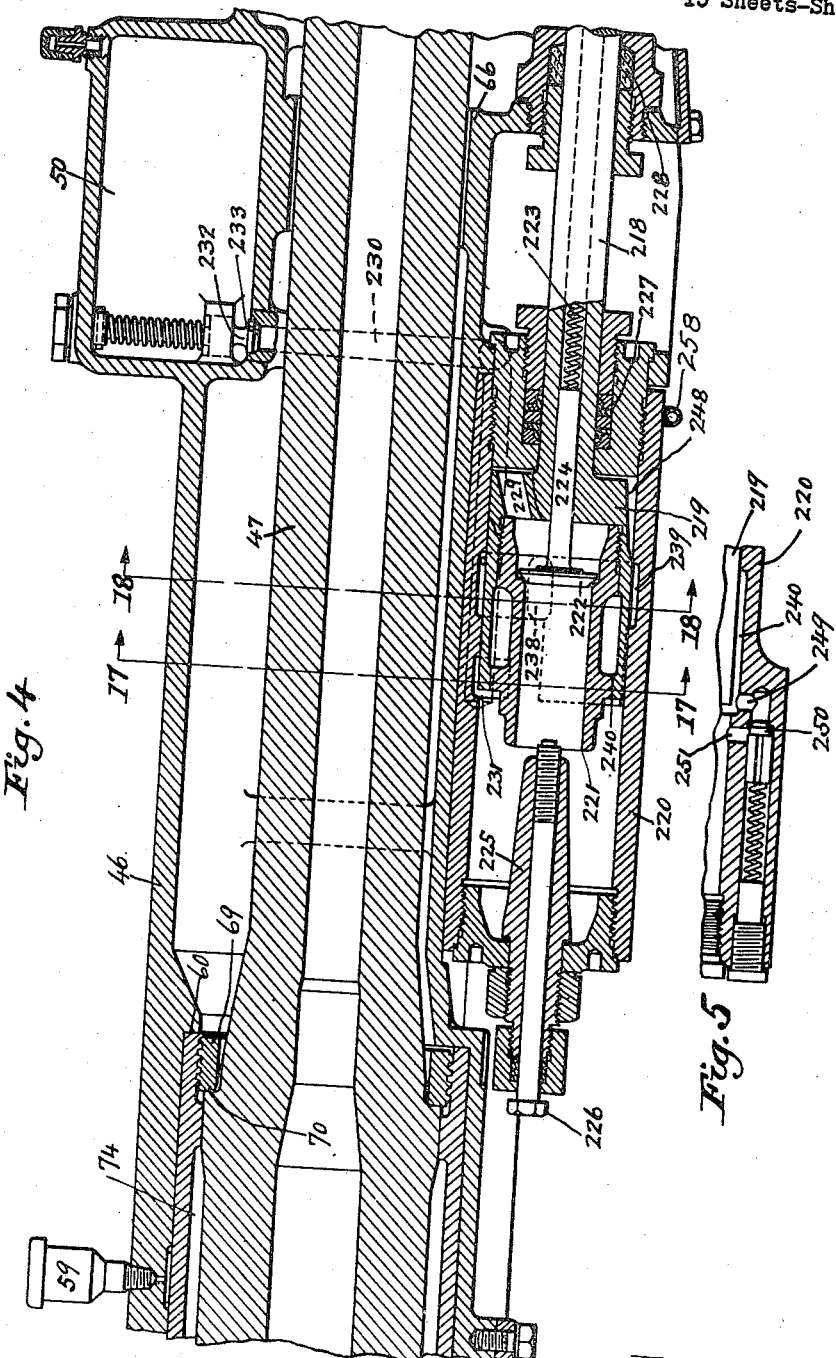
Inventors:
George A. Chadwick
Paul W. Burk
by Robert A. Lavender
Attorney.

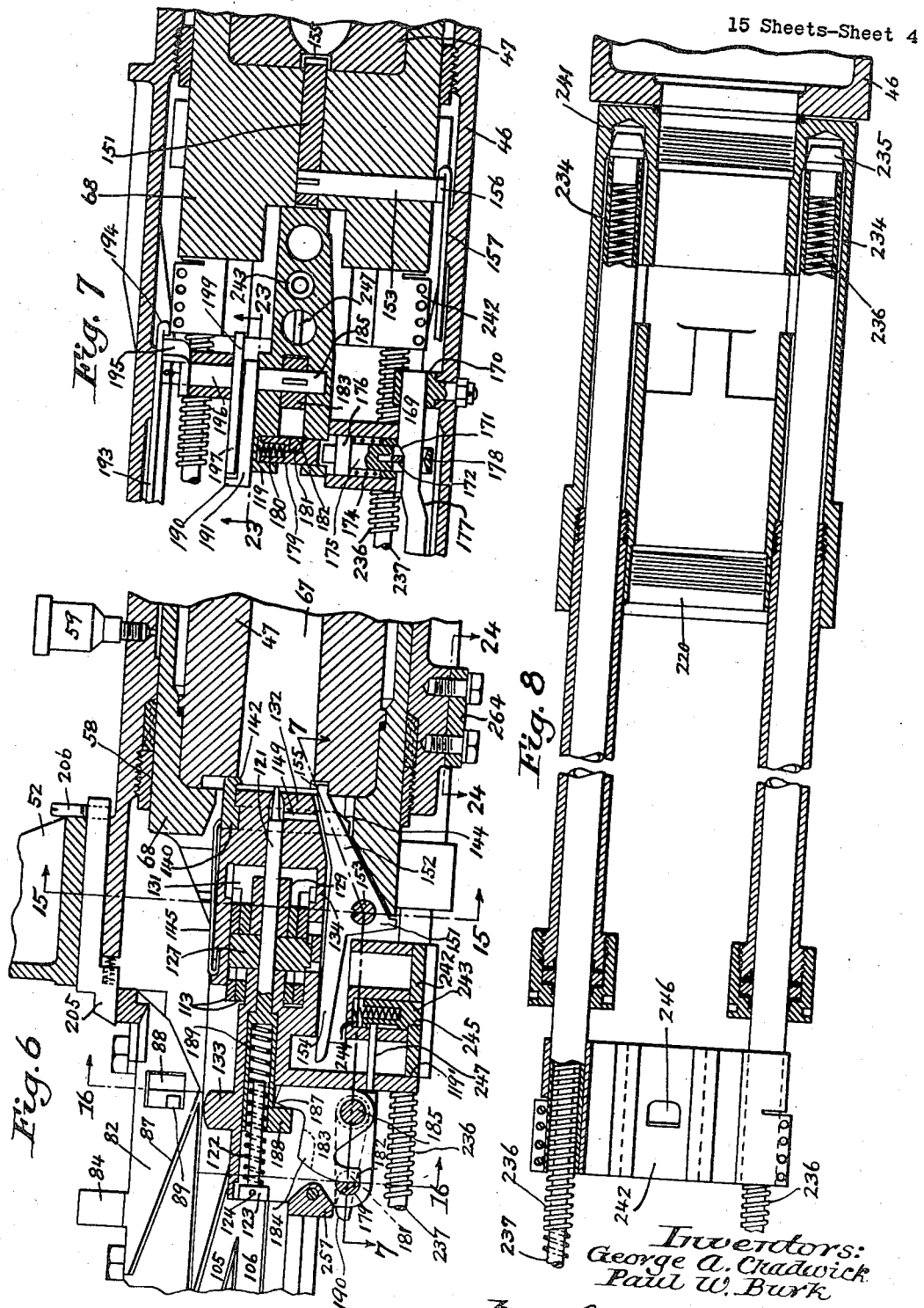

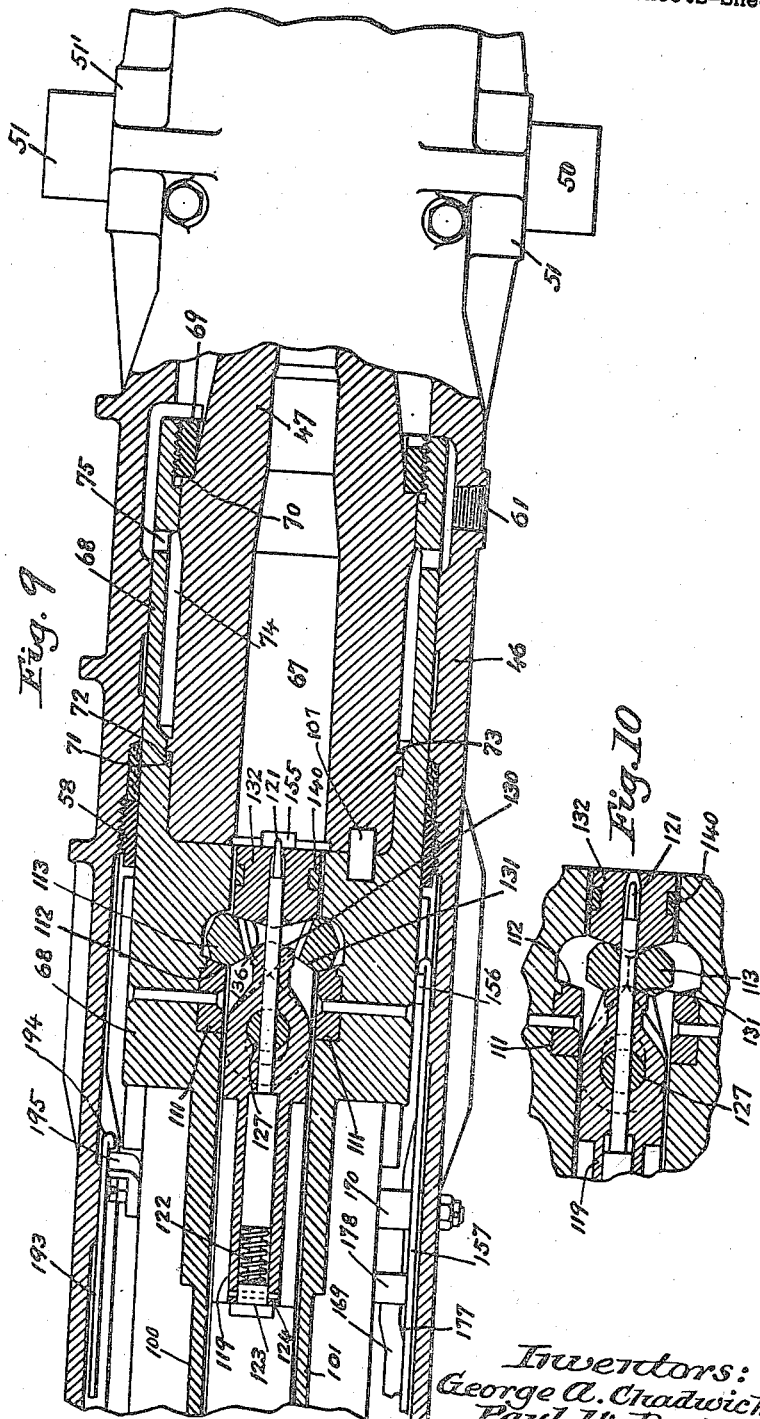

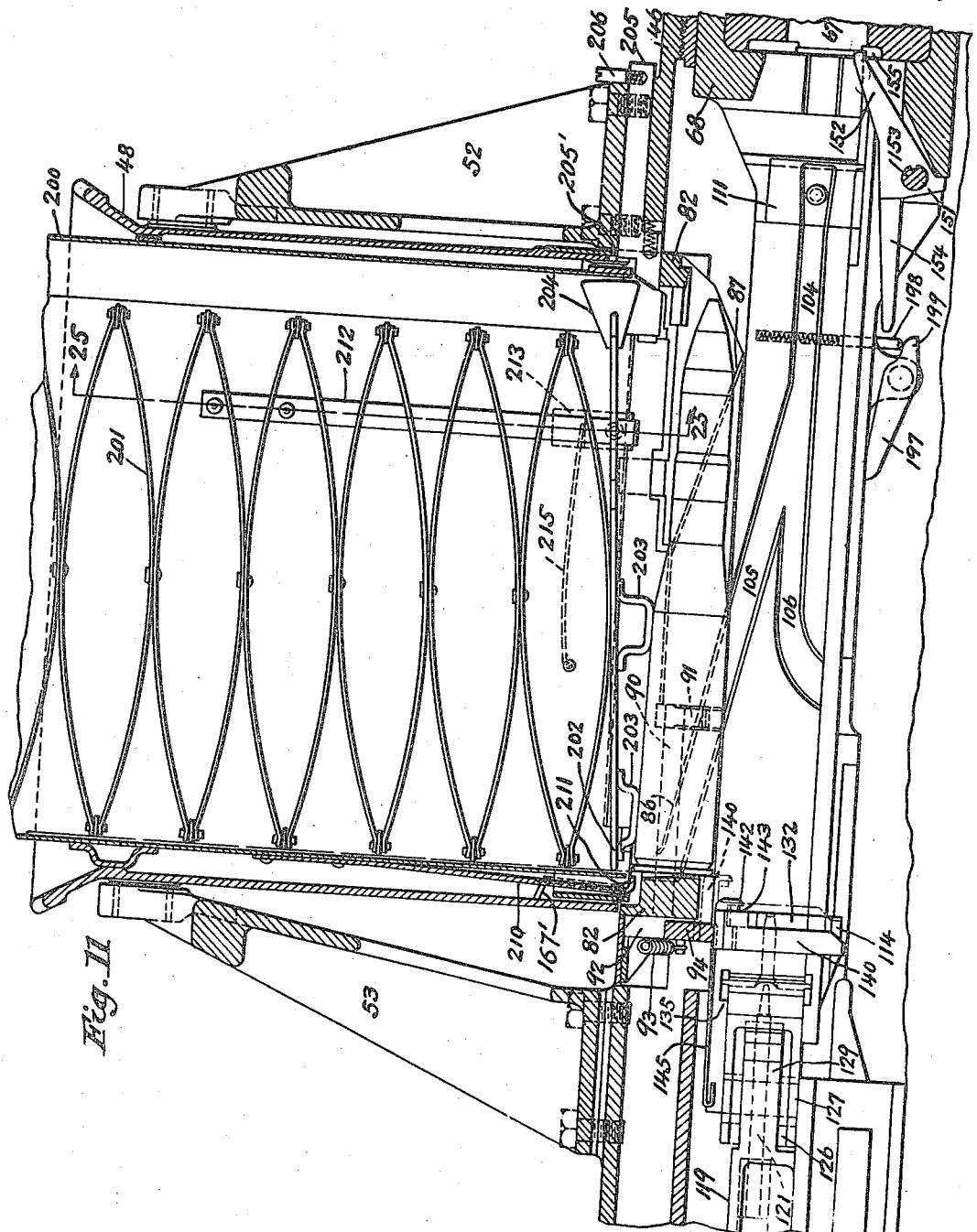

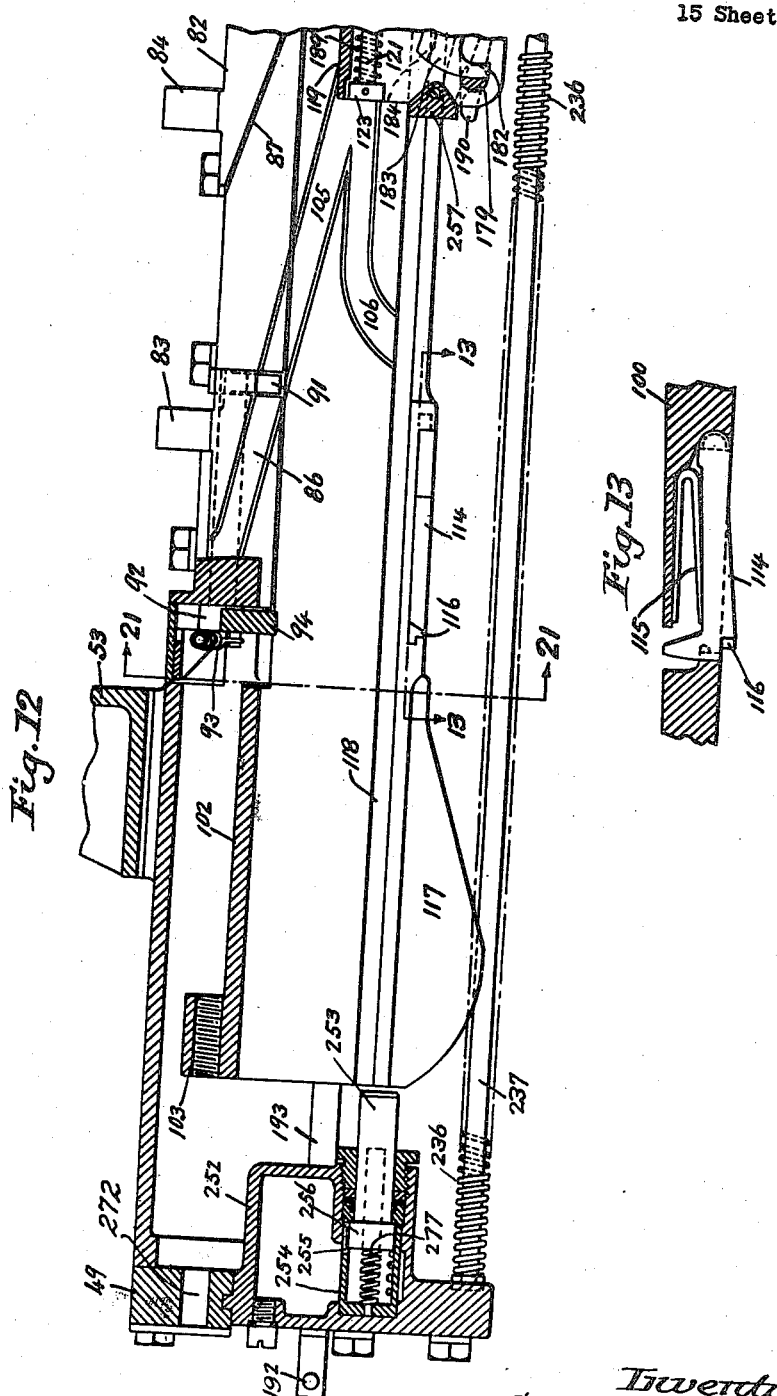

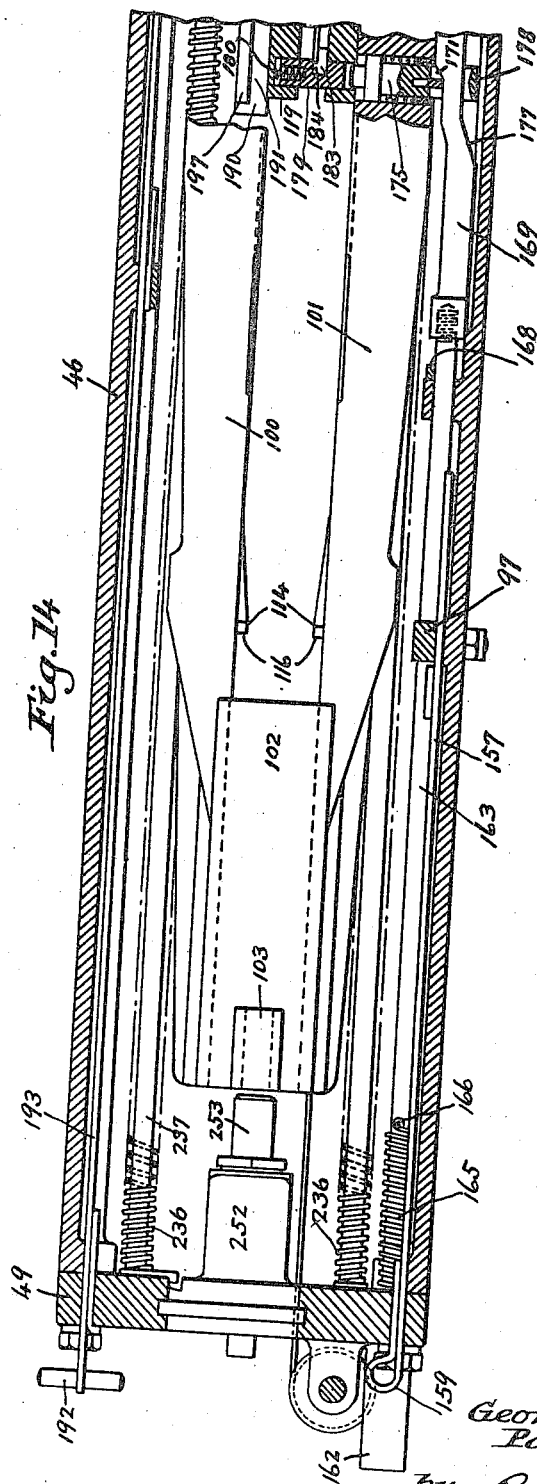

Nov. 16, 1948.  G. A. CHADWICK ET AL  2,453,830
MACHINE GUN
Filed Dec. 21, 1932  15 Sheets-Sheet 9

Inventors:
George A. Chadwick
Paul W. Burk
by Robert A. [Attorney]
Attorney.

Nov. 16, 1948.  G. A. CHADWICK ET AL  2,453,830
MACHINE GUN
Filed Dec. 21, 1932
15 Sheets-Sheet 10
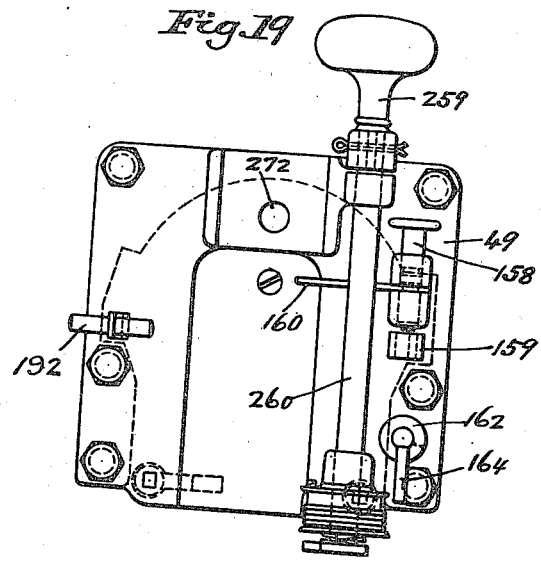
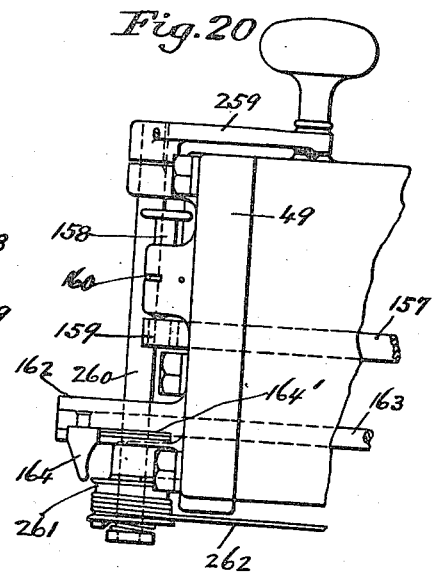
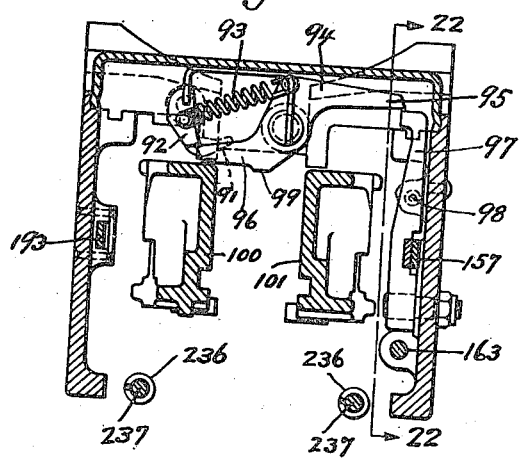
Inventors:
George A. Chadwick
Paul W. Burk
by Robert A. Saunders
Attorney.

Nov. 16, 1948.  G. A. CHADWICK ET AL  2,453,830
MACHINE GUN
Filed Dec. 21, 1932  15 Sheets—Sheet 11
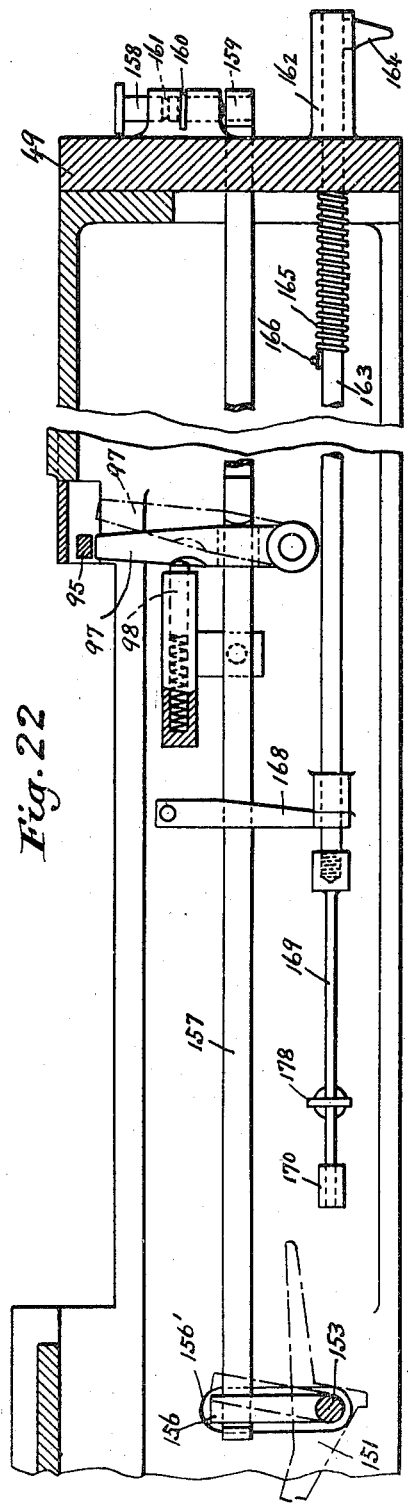
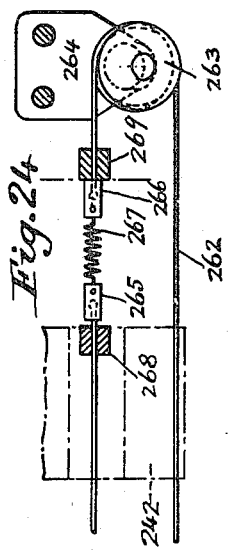
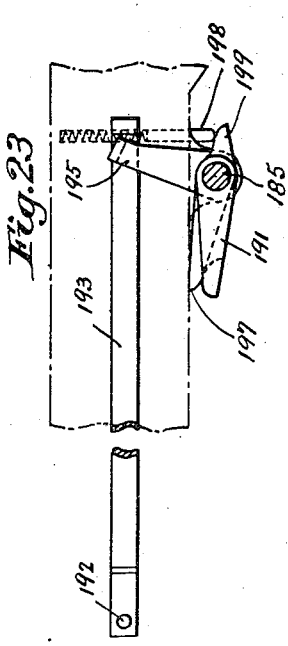
Inventors:
George A. Chadwick
Paul W. Burk
by Robert A. Townsend
Attorney.

Nov. 16, 1948.　　　G. A. CHADWICK ET AL　　　2,453,830
MACHINE GUN
Filed Dec. 21, 1932　　　15 Sheets-Sheet 12
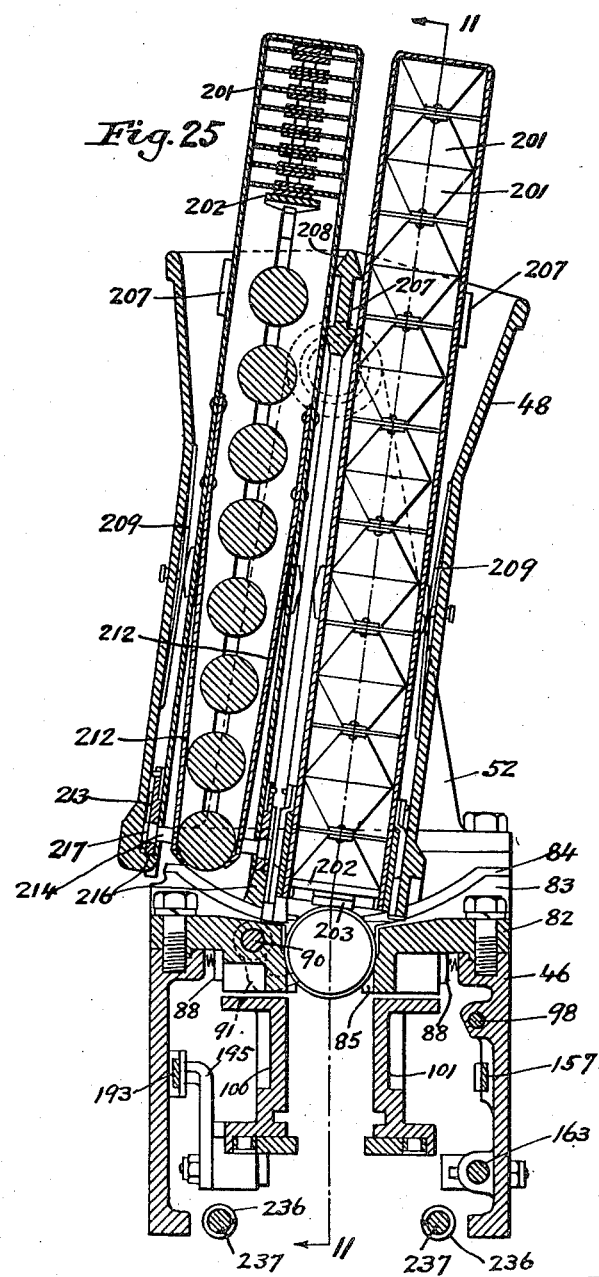

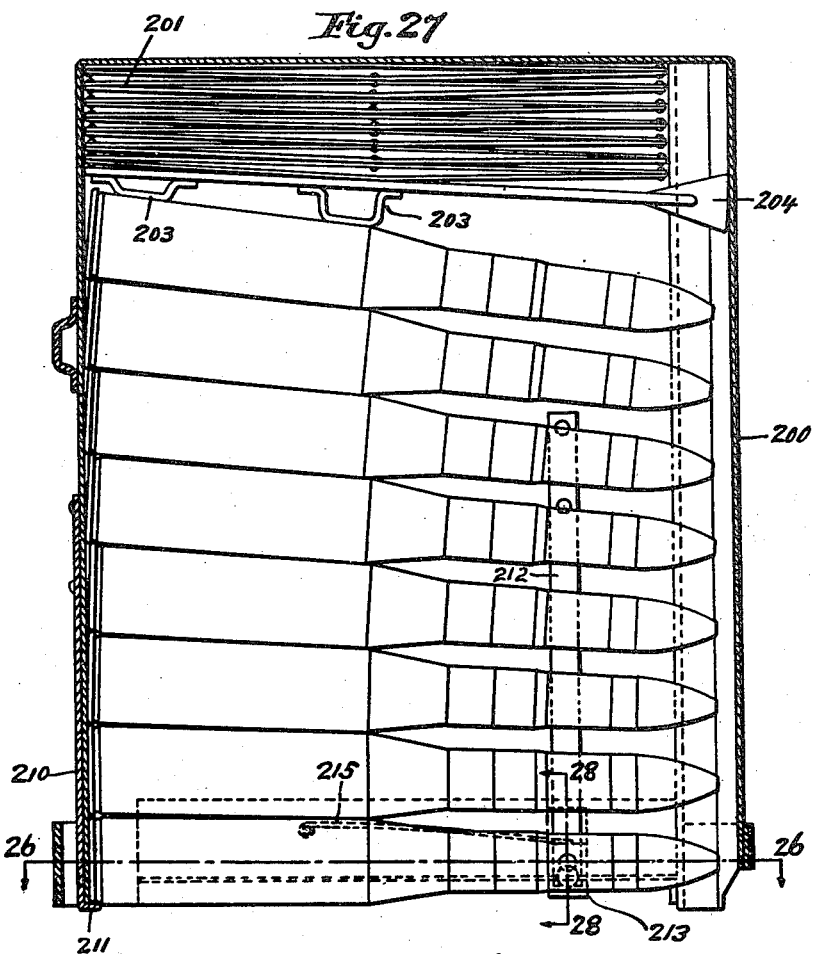

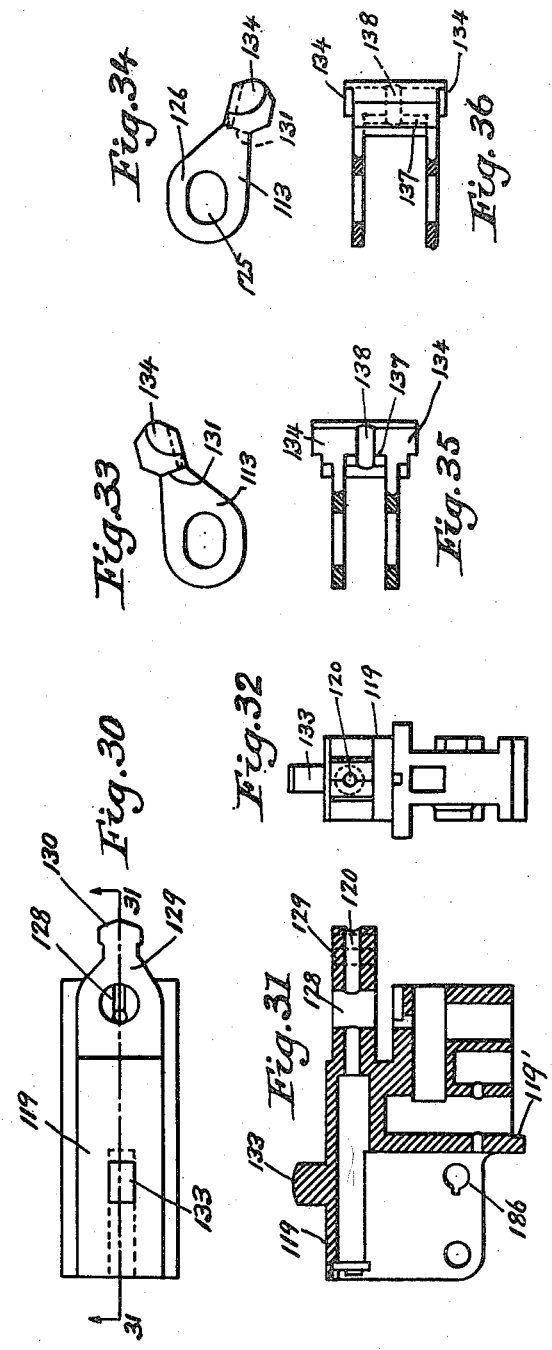

Nov. 16, 1948.  G. A. CHADWICK ET AL  2,453,830
MACHINE GUN
Filed Dec. 21, 1932  15 Sheets-Sheet 15
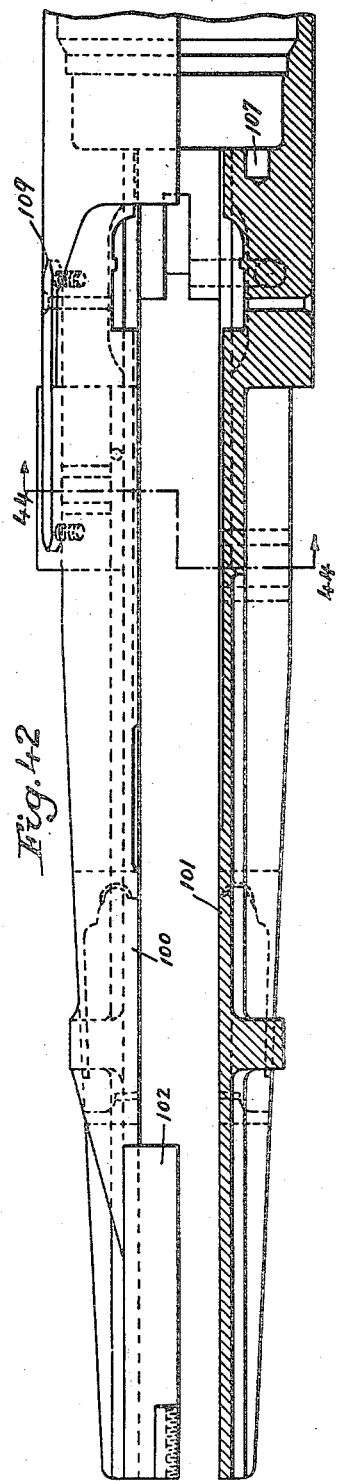
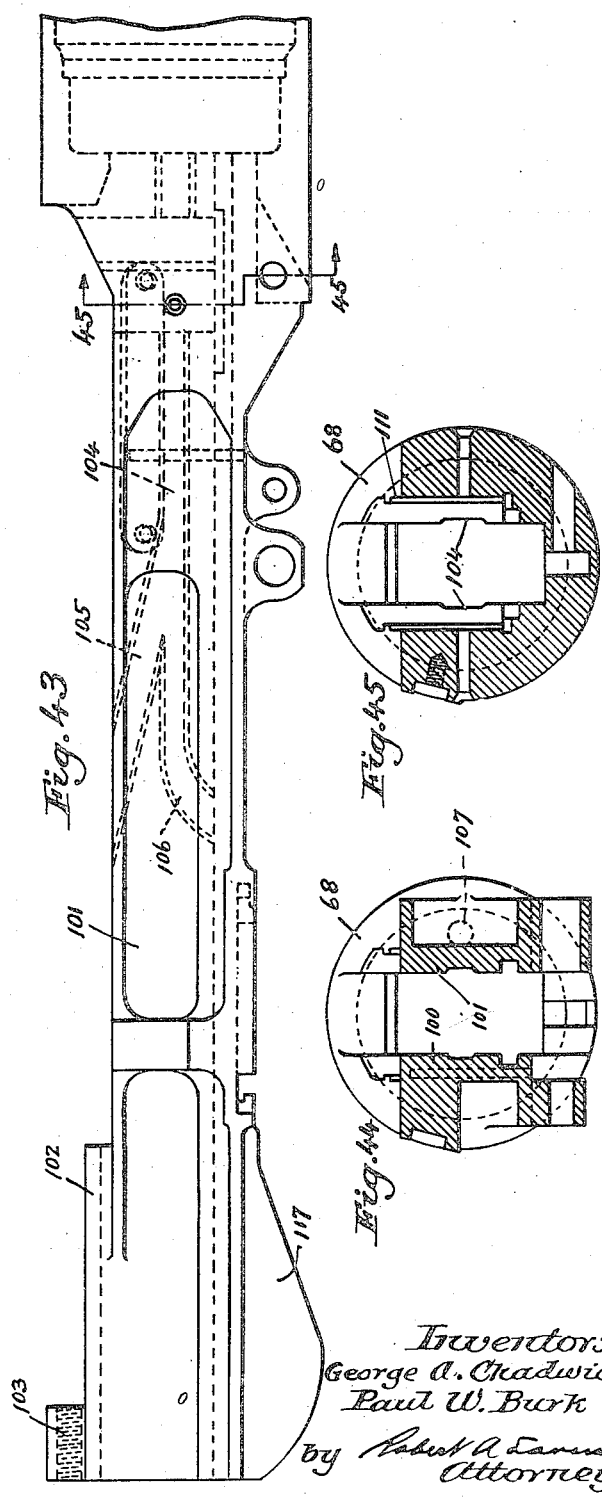
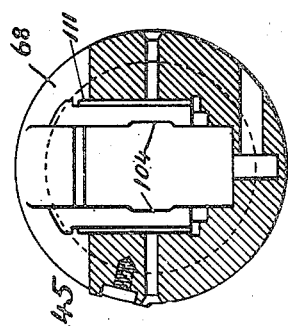
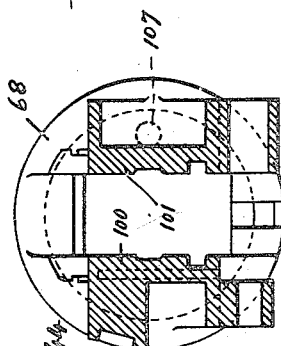
Inventors:
George A. Chadwick
Paul W. Burk
by Robert A. Lavender
Attorney.

Patented Nov. 16, 1948

2,453,830

UNITED STATES PATENT OFFICE 2,453,830

MACHINE GUN

George A. Chadwick and Paul W. Burk,
Washington, D. C.

Application December 21, 1932, Serial No. 648,296

22 Claims. (Cl. 89—190)

This invention relates to a machine gun and has for its numerous objects the general improvement of the effectiveness and safety of this type of weapon. The several objects will more fully appear from the description of the construction and operation of our invention.

In the drawings:

Fig. 1 is a side elevation of the assembled gun;

Fig. 2 is a partial longitudinal section showing the water jacket and recoil spring;

Fig. 3 is a detail view showing a cartridge in the feed plate ready to be forced into the chamber;

Fig. 4 is a partial longitudinal section showing the recoil actuated breech operating mechanism;

Fig. 5 is a sectional detail of a relief valve in the hydraulic breech operating mechanism;

Fig. 6 is a partial longitudinal section through the breech mechanism;

Fig. 7 is a partial transverse section on line 7—7 of Fig. 6;

Fig. 8 is a sectional detail of the plunger mechanism on line 8—8 of Fig. 18;

Fig. 9 is a transverse section showing the breech block and breech locking mechanism in the closed position;

Fig. 10 is a fragmentary view of the same parts as shown in Fig. 9 with the breech block unlocked;

Fig. 11 is a partial longitudinal section through an empty magazine in position above the loading plate taken on line 11—11 of Fig. 25;

Fig. 12 is a longitudinal section of the rear portion of the gun slide showing the buffer mechanism for stopping the carrier;

Fig. 13 is a detail view of the extractor lifting cams;

Fig. 14 is a transverse section of the rear end of the slide showing the breech housing moved back;

Fig. 19 is a face elevation of the breech end of the gun;

Fig. 20 is a side elevation of the parts shown in Fig. 19;

Fig. 21 is a cross section on line 21—21 of Fig. 12 showing the mechanism to prevent operation of the gun in the event of failure to extract a spent case from the chamber and to stop the operation of the gun in such a position that the breech is open;

Fig. 22 is an elevational detail view of the carrier locking mechanism and the trigger assembly;

Fig. 23 is a detail view of a part of the hand cocking mechanism;

Fig. 24 is a detail view of a means for manually moving the carrier rearwardly;

Fig. 25 is a cross section through an empty magazine and a loaded magazine in position in the cradle taken on line 25—25 of Fig. 11;

Fig. 26 shows a cartridge in the lower part of a magazine in the position indicated by line 26—26 of Fig. 27;

Fig. 27 is a view of a loaded magazine with one side thereof removed;

Figs. 28 and 29 show details of the means for supporting the noses of the cartridges in the magazine;

Figs. 30, 31 and 32 are respectively top plan view, longitudinal section and rear end view of the carrier;

Figs. 33, 34, 35 and 36 are details of the breech locking wedges;

Figs. 37, 38 and 39 are respectively a longitudinal section, a side elevation and a front elevation of the breech block;

Figs. 40 and 41 are respectively longitudinal section and front end elevation of the extractor;

Fig. 42 is a top plan view of the breech housing with parts in section;

Fig. 43 is a side elevation of the breech housing;

Fig. 44 is a cross section of the breech housing on line 44—44 of Fig. 42;

Fig. 45 is a cross section on line 45—45 of Fig. 43.

Figure 15:
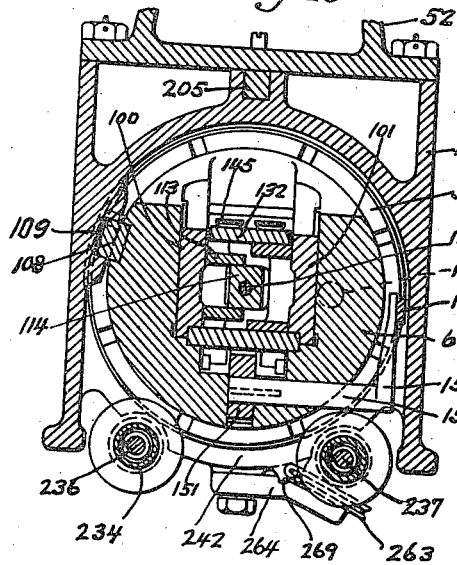
Fig. 15 is a cross sectional view through the carrier and breech block on line 15—15 of Fig. 6.

This gun is composed of the following main parts or assemblies: A slide 46, a gun barrel 47, a magazine cradle assembly 48, a breech mechanism, a feed plate, a recoil and breech operating system, and a cooling system.

The slide 46 is preferably a bronze casting and serves as a foundation upon which the rest of the gun is built. Upon the rear end of the slide is mounted the rear plate 49. Adjacent the forward end is formed an expansion chamber 50 for the oil used in the hydraulic recoil system. Trunnions 51 serve to mount the gun pivotally in any suitable supporting means adjacent which are pads 51' for securing an elevating arc to the gun. The forward bracket 52 and rear bracket 53 support the magazine cradle 48. The forward end 54 of the slide is contracted to serve as the forward bearing in which the gun barrel slides and is externally threaded at 55 to provide means for securing the water jacket 56 thereto. An oil cup 57 supplies lubricant to the forward bearing. Just forward of the bracket 52 the slide is thickened to form the rear bearing and has a shoulder 60 formed thereon to act as the stop for the forward movement of the barrel, lubricant for the rear bearing being fed from cup 59. In the slide there is provided a packing gland 58 to prevent leakage of the cooling water which is introduced through the hole 61 and withdrawn through outlet 62, it being the intention to circulate running water to cool the gun. Recoil cylinder 220 is secured to the lower side of the slide between the rear bearing and expansion chamber 50, while the forward end of the slide is extended downwardly to form a pocket 64 for the recoil yoke, access thereto being had by removing plate 65. On the under side of the gun below the chamber 50 is a shoulder 66 that is the stop for the rearward movement of the barrel; it is engaged by the rear side of the yoke if the brake mechanism does not theretofore stop the recoil movement.

The gun barrel 47 is a single tube having a chamber 67 at its rear end to receive the cartridge. Breech housing 68 is secured to the barrel by an internal nut 69 screwed into the forward end of the breech housing and bearing against shoulder 70 on the barrel to draw shoulder 71 on the breech housing against packing 72 that is disposed between shoulder 71 and rib 73 on the barrel to prevent leakage of the cooling water which enters through hole 61 and flows around the barrel in space 74 from which it passes through opening 75. Forward of the breech housing, the barrel 47 is externally threaded to receive a nut 76 that clamps the recoil yoke 77 against shoulder 78 on the barrel. Some distance forward of the yoke 77, barrel 47 is externally threaded to receive a nut 79 that confines recoil spring 80 under the desired degree of compression against the front end of the slide. The front end of water jacket 56 is closed against leakage by a gland 81 secured in the end of jacket 56.

Cartridges are received from the magazine by feed plate 82 that is fixed to the slide between brackets 52 and 53. This plate is provided with transverse ribs 83 and 84 against which the bottom cartridge in a magazine will bear, the latter rib being higher than the former to support the smaller end of the cartridge. The upper faces of these ribs are arcuate with their centers of curvature on the opposite sides of a vertical axial plane through the gun so that the pressure of cartridges against the ribs will produce a component tending to swing the magazine toward the median longitudinal slot 85 through which the cartridges pass to be rammed into the chamber. Grooves 86 lead downwardly from the rear end of slot 85 to guide the rim of the cartridge case into alignment with the chamber; the slot 85 is narrowed forwardly to form a downwardly sloping cam surface 87 facing rearwardly and downwardly at each side of the slot 85 to engage the sharply tapered portion of the cartridge to guide the nose thereof to chamber 67. Spring pressed plungers 88 support the nose of the cartridge in the feed plate, these plungers having suitably beveled faces to engage the sloping surface of the bullet and a beveled projection 89 to extend partially thereunder. The lower faces of the plungers 88 contact sloping faces on the feed plate 82 to prevent their being moved away from the cartridge by the weight thereof or by the pressure of the magazine springs. A shaft 90 is rotatably mounted in the rear end of feed plate 82 and has secured to it a detent 91 that extends out into slot 85 in position to be engaged by a cartridge passing into the slot. At the rear face of feed plate 82 a feed sear 92 is secured to shaft 90 and is connected to spring 93 under tension that tends always to move the detent 91 into slot 85. Rear stop lever 94 has offset arms 95 and 96, the latter being disposed under the free end of feed sear 92 except when the detent 91 is moved out of slot 85 by a cartridge.

Stop sear 97 is pivotally mounted on the slide with its free end movable under the end of arm 95 of the rear stop lever, but normally held out of that position by a spring pressed plunger 98 that acts upon carrier locking rod 157 connected to the stop sear. Upon the rear stop lever is a surface 99 against which the extractor contacts and since the rear stop lever cannot be rotated unless detent 91 is moved out of slot 85 by a cartridge, and also unless stop sear 97 is clear of arm 95 of rear stop lever 94, the carrier will be held and the operation of the gun will be stopped, as will be hereinafter more fully explained.

The breech mechanism takes the cartridge from feed plate 83, rams it into the gun chamber 67, closes the breech, fires the charge, opens the breech, extracts and ejects the empty case. It consists of the breech housing, carrier, breech block, firing mechanism, rear stop lock, anti-double loader, and carrier buffer.

The breach housing 68 is a steel forging connected to the barrel as above set forth in connection with the description of the barrel. The forward end of the breech housing is bored out to receive the chamber end of the barrel and has formed in it the space 74 for the circulation of cooling water. The outer surface of the forward end of the breech housing slides in the rear bearing and the front end thereof contacts shoulder 60 to stop forward movement of the barrel. A short distance from the back face of the barrel the breech housing is divided into two side members 100 and 101 that extend almost to rear plate 49 where they are connected together by a bridge 102 that carries an internally threaded lug 103 adapted to be engaged by a threaded rod to pull the breech housing backwardly for testing the gun. In the inner face of members 100 and 101 are formed grooves 104 to engage the rim of the cartridge case and guide the case along the axis of the gun into the chamber, these grooves being connected to grooves 86 in the feed plate by an inclined portion 105. A curved groove 106 in each of members 100 and 101 connects with grooves 104 in the same member, respectively, and guides the spent case downwardly and out of the gun. A dowel pin 107 serves to position the barrel properly in the breech housing and a key 108 disposed in groove 109 in the housing and groove 110 in the slide prevents rotation of the housing and barrel with respect to the slide, but permits relative longitudinal movement between these parts. A short distance from the rear face of barrel 47 a block 111 is set in each side of the passage through the breech housing; each of these blocks has an outwardly sloping face 112 to coact with a face on a locking wedge 113. A short distance forward of the rear ends of members 100 and 101 there is disposed in each of these members an extractor-lifting cam 114, each cam being pivotally mounted at one end and urged toward the space between members 100 and 101 by a U-shaped spring 115, as shown in Fig. 13. Each of these cams has a rearwardly sloping face 116 to permit the extractor to ride up over the cams when the breech mechanism is being moved forwardly.

The member 101 carries at its rear end a downwardly extending cam 117 for automatically cocking the firing mechanism.

Grooves 118 are formed in the inner faces of members 101 in which grooves the carrier 119 is slidably mounted. As shown in Figs. 30 to 32 inclusive, the carrier has in it a longitudinally extending bore 120 in which the firing pin 121 is slidable, the rear portion of this bore being of greater diameter to receive the enlarged rear portion of the firing pin in which firing pin spring 122 is held in operative position by the spring retainer 123 secured to the carrier by pin 124. Locking wedges 113 have elongated holes 125 in their limbs 126 to receive a pin 127 that is seated in a hole 128 in the carrier, which pin is bored to permit the firing pin to be passed therethrough, the elongation of the hole permitting the locking wedges to slide as well as pivot on pin 127, the limbs of each locking wedge being placed astride the portion 129 of the carrier. The front end of portion 129 has on it oppositely sloping faces 130 that engage faces 131 on the locking wedges 113 to force the wedges apart and into engagement with faces 112 of blocks 111 whereby the breech block 132 is held firmly against the base of a cartridge in chamber 67; portion 129 lies between the locking wedges when in the breech locking position to prevent casual movement of the wedges from that position. On the upper surface of carrier 119 is a lug 133 to support the nose of a cartridge in case the spring pressed plungers 88 fail to function.

The locking wedges 113 (Figs. 33-36) each have two limbs 126 adapted to embrace the portion 129 of carrier 119, the limbs of one of the wedges being sufficiently spaced apart to lie outside the limbs of the other wedge. Upon the upper and lower surface of each wedge 113 at its forward end is a lug 134 having a rounded rearward face, which lugs are adapted to seat in grooves 135 in the breech block, the grooves 135 being formed to define a very obtuse angle opening forwardly, the front edges of the grooves having somewhat the same angular relation to each other as do faces 136 on the breech block that are engaged by the locking wedges when ramming a cartridge into the chamber. Upon rearward movement of the carrier after firing, pin 127 pulls back on the wedges and lugs 134 engage the rear faces of slots 135 and thereby draw the locking wedges backward, the inward slope of the rearward faces of the groove moving the locking wedges in so they will clear the blocks 112 and permit the breech block to be unseated. A beveled surface 137 on the rear inner face of each locking wedge provides an appreciable contact area against which portion 129 bears to lock the wedges positively in the closed position. The inner face of each wedge 113 has in it a groove 138, semi-circular in cross section, to provide clearance for the firing pin.

Adjacent the forward end of breech block 132 is a groove 139 that extends across and down each side of the breech block to receive extractor 140. As shown in Figs. 40 and 41, the extractor is a substantially horseshoe-shaped member having legs to engage in the slot 139 on the sides of the breech block and a forwardly projecting portion 141 with a backwardly sloping beveled face 142 on its lower edge and a slot 143 back of that edge, the beveled face 142 being adapted to engage the rim of a cartridge case to cause the extractor to ride up over the rim and thus set the rim in slot 143 whereby backward movement of the breech mechanism will withdraw the spent case from the chamber. A backwardly sloping face 144 is formed on the forward edge of each leg of the extractor at the lower end thereof to cause the extractor to slide over extractor cams 114 as the breech mechanism is being moved forwardly to ram a new cartridge. Two extractor springs 145 have their rear ends bent over and engaged in a slot 146 in the upper rear portion of the breech block and extend forwardly to lie upon the upper face 147 of the extractor to move the extractor downwardly upon the breech block and yet permit it to rise sufficiently to pass the rim of a cartridge case. Breech block 132 has in it a passage 148 for the firing pin, and leading downwardly from that passage a small opening 149 to permit the escape of gases that may enter the passage 148 from a ruptured primer and also to permit any particles of carbon that may be carried by such gas into the passage 148 to drop from the passage and so prevent interference with the movements of the firing pin by such particles. In the lower portion of the forward end of breech block 132 is a forwardly and upwardly sloping slot 150 to accommodate one arm 152 of the anti-double loader lever 151, which arm is adapted to be engaged by the rim of a cartridge case in the chamber thereby rocking shaft 153 and actuating a carrier locking mechanism hereinafter to be described to prevent a second cartridge being rammed while a case is still in the chamber. The arm 154 of lever 151 will catch the nose of a cartridge that may have dropped down unduly while being loaded and guide the same up into chamber 67. A slot 155 is formed at the lower rear portion of chamber 67 to receive arm 152 of lever 151 when a cartridge case is in the chamber. The outer end of shaft 153 carries a lever 156 that engages a hook on carrier locking rod 157 that is connected to stop sear 97 whereby, when arm 152 is held down by the rim of a cartridge case in the chamber and lever 156 is thereby rocked forwardly, the stop sear 97 is moved under arm 95 of rear stop lever 94 and the rear stop lever cannot then rotate on its pivot so that when the face 99 of rear stop lever is contacted by extractor 140, the extractor is prevented from riding up over extractor cams 114 and the mechanism is locked with the breech open. The position of lever 156 may be ascertained by looking through hole 156' in the slide and hence it can be determined whether failure to fire is due to hangfire or misfire or failure to ram a charge. However, when the breech is open and the case has been extracted, as in normal operation, stop 97 is held back by plunger 98 and the rear stop lever can be rotated by the extractor, thus permitting the extractor to move over the extractor cams and allow the breech mechanism to close. When it is desired to hold the breech open, carrier locking rod 157 may be held in the forward position, in which the stop sear 97 is under arm 95 of the rear stop lever, by moving plunger 158 downwardly through a loop 159 formed on the rear end of the carrier locking rod, or by pressing the thumb against loop 159. A hairpin-shaped spring 160 is provided to engage grooves 161 in plunger 158 to retain the plunger in either the locking or unlocking position.

Figure 16:
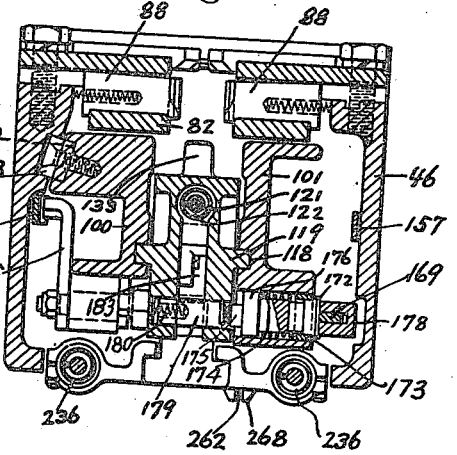
Fig. 16 is a view similar to Fig. 15 but taken on line 16—16 of Fig. 6.
Figure 17:
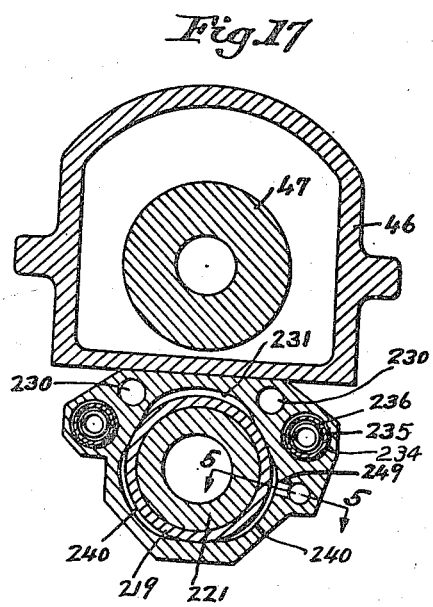
Fig. 17 is a cross section through the barrel and the hydraulic recoil mechanism on line 17—17 of Fig. 4.
Figure 18:
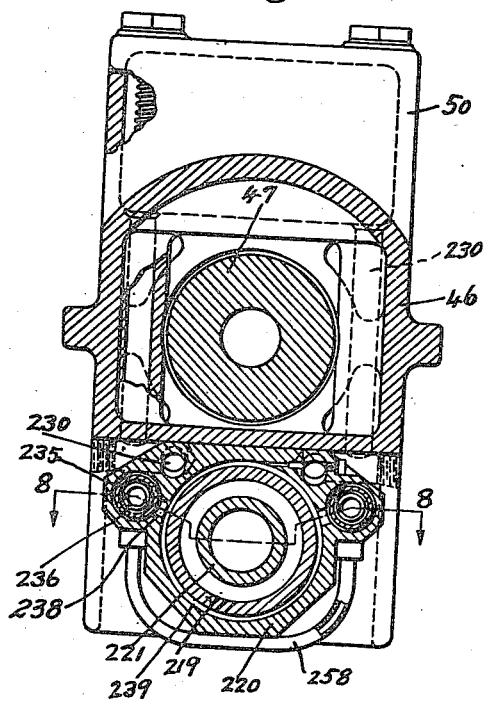
Fig. 18 is a view similar to Fig. 17 taken on line 18—18 of Fig. 4.

From rear plate 49 a sleeve 162 extends outwardly, this sleeve having in it a passage in which a trigger rod 163 is slidable and having a slot in the lower part of its wall to permit sliding movement of trigger 164. Spring 165 is disposed around trigger rod 163 and is held under compression between a pin 166 fixed to rod 163 and the inner face of rear plate 49 to hold trigger rod 163 normally forwardly and also under rotational tension to exert a clockwise torque on trigger rod 163. Opening into the right-hand side of the passage in which trigger 164 slides is a slot 164' having a forwardly extending portion. The stop 168 prevents movement of bar 169 connected to rod 163 to the rear to the extent that bar 169 would be withdrawn from guide 170. Stop 168 is resilient and can be moved aside to permit the withdrawal of bar 169 from guide 170 s disassembling. A cam surface 171 on the inner face of bar 169 is engageable with a member 172 (Fig. 16) that bears against a collar 173 slidably mounted in the breech housing; a spring 174 is disposed around a plunger 175 between collar 173 and a flange 176 on the plunger. A cam face 177 on the outer edge of bar 169 is adapted to contact a yoke 178 connected to the plunger to move the plunger outwardly when the breech is to be opened manually. To do this, trigger 164 must be turned counter clockwise and moved forward in slot 164'. The delay in opening the breech thus occasioned is an added factor of safety in case of a hangfire. So long as plunger 175 is held inwardly, the breech cannot be opened. In automatic fire, as the barrel and breech housing are moved back by the recoil, the plunger 175 moves with them and thus the yoke 178 is made to ride over cam face 177 on member 169, which is carried by the slide and does not recoil, which withdraws the plunger 175 and permits the breech to be opened, as will hereinafter be explained.

Slidably mounted in carrier 119, to be in alignment with plunger 175 when the breech is closed, is a sear 179 that is urged toward the plunger 175 by a spring 180. Sear 179 has in its forward side a slot 181 in which arm 182 of sear lever 183 is slidable, the sear lever having in one face a cut-away portion to form a shoulder 184 with which the sear will be moved into engagement by spring 180 when the sear lever is rocked backwardly by pivot 185 that is mounted in opening 186 in the carrier. Arm 187 of sear lever 183 engages toe 188 of the firing pin 121 and thus draws back the firing pin and compresses firing pin spring 122 against spring retainer 123 when the sear lever is rocked backward. When trigger 164 is moved backwardly to bring cam face 171 into the position with respect to plunger 175 shown in Fig. 7, spring 174 is free to move plunger 175 toward sear 179 and disengage the sear from shoulder 184 on sear lever 183 which permits the spring 122 to drive the firing pin forward and fire the cartridge.

The gun is cocked, that is, sear lever 183 is rotated to retract the firing pin and compress the firing pin spring, by the portion 190 of cocking lever 191 being formed downwardly by automatic cocking cam 117 carried by member 100 of the breech housing. Lever 191 is connected to pivot 185 upon which sear lever 183 is keyed and thus the downward movement of this lever 191 rotates sear lever 183 backwardly which effects the cocking operation. Provision is made for recocking the gun by hand by means of a bar 192 mounted in a rod 193 that is slidable through rear plate 49 and has a hook 194 formed on its forward end to engage a lever 195 carried by a shaft 185 to the other end of which is connected a lever 197 that may be brought into engagement with portion 190 of lever 191 to rock lever 191 backwardly. A spring pressed plunger 198 bears against a finger 199 extending oppositely to lever 197 and connected thereto to retain lever 197 in contact with hook 194 on rod 193.

Ammunition is fed into the gun from magazines 200 mounted in cradle 48. The magazines are enclosed on all sides except that which is presented to the feed plate when mounted in the cradle. A plurality of leaf springs 201 connected together at their ends and substantially at their mid points are placed under compression when the magazine is loaded and force the cartridges out when feeding into the gun. A push plate 202 connected to the lowermost leaf has members 203 attached thereto to contact the cartridge case and a trip plate 204 at its forward end to release the cradle latch when the magazine is empty. At the lower edge of the forward end of each magazine 200 is a slot 205' into which the cradle latch 205 may pass to lock the cradle in position to align the cartridges in the magazine that is engaged by the cradle latch with slot 85 in the feed plate, the inner end of latch 205 extending a short distance into the magazine in position to be contacted by trip plate 204 when the magazine is empty. A pin 206 is fixed in latch 205 to facilitate manual movement of the latch. Each magazine is provided on each of its sides with a block 207 that fits in a recess in the face of bar 208 that extends lengthwise of the cradle at its upper side to support the magazine in the cradle, the springs 209 secured to the sides of the cradle serving to hold blocks 207 seated in the recess in bar 208 but yielding readily to facilitate placing the magazine in the cradle.

The rim ends of the cartridges are retained in the magazine by a spring clip 210 that has an overturned portion 211 which extends beneath the rim of the lowermost cartridge until the magazine is placed in cradle 48 at which time tabs 167 carried by portion 211 ride over cam members 167' in cradle 48 and move the overturned portion out of engagement with the cartridge rim to the position shown in Fig. 11. The noses of the cartridges are supported by spring clips 212 inside the magazine at the forward end thereof, each of which has its lower end inturned toward the cartridge. A plate 213 is slidably carried on the outside of the magazine and normally covers the aperture in the side of the magazine through which pins 214 fixed to the clips 212 are adapted to pass (Fig. 26), the plates 213 being held in position to cover those apertures by springs 215 bearing thereon. However, when the magazine is placed in the cradle, the lower edge of each plate 213 contacts a shoulder 216 at the lower edge of the cradle and the plate is moved upwardly to align an aperture 217 in the plate with the corresponding pin 214 whereupon the action of the pressure of springs 201 against the cartridges forces clips 212 laterally and the cartridge may then move out of the magazine. The force exerted by the lowermost cartridge against ribs 83 and 84 due to springs 201 has a component directed toward the slot in said plate and therefore, as soon as cradle latch 205 is released by contact with the trip plate 204 in an empty magazine, the loaded magazine is caused to move into position above slot 85 in the feed plate where it is locked by latch 205 until it in turn has been emptied. This method of loading from the top of the gun and the ejection of the spent cases from the under side thereof permits placing several guns in a single mount if desired, which is not possible where the ammunition is fed through the sides as is the usual practice. So long as the empty magazines are replaced by loaded magazines and the gun continues in action, the cradle will be automatically swung back and forth to position the loaded magazines over the slot in the feed plate as soon as the previously used magazine is emptied.

The gun mechanism is operated by the recoil due to the discharge of the cartridge which moves barrel 47 back in slide 46 and comprises recoil spring 80, thus storing up energy to return the gun to battery. Yoke 77 is connected to the barrel and to piston rod 218 that carries piston 219 slidably mounted in recoil cylinder 220. Inside piston 219 is mounted a throttling tube 221 having in it a seat for valve 222 that closes the passage through the throttling tube at certain times and is normally held against its seat by spring 223 bearing against the valve stem 224 which is slidably mounted in piston rod 218. Valve 222 has a somewhat close fit in the forward portion of the throttling tube to restrict the passage of the liquid, which increases the pressure on the rearward face of piston 219 and results in a greater braking effect on the recoiling parts of the gun. Throttling rod 225 is mounted in the rear end of recoil cylinder 220 and has threaded in it the valve stroke adjusting bolt 226 to hold valve 222 unseated for a predetermined time. Suitable stuffing boxes 227 and 228 prevent leakage of oil or water around piston rod 218. The space in cylinder 220 in front of piston 219 is in communication with the passage through the throttling tube by a port 229. Expansion chamber 50 is connected to cylinder 220 through passages 230, of which there is one on each side of the gun barrel, opening into the cylinder through port 231. Each passage 230 is normally closed at the bottom of the expansion chamber by a spring loaded relief valve 232 having a small hole 233 therethrough to permit slow leakage of oil from the chamber into the recoil mechanism. If surges are set up in the oil in recoil cylinder 220 by rearward movement of piston 219, some oil will be forced up through the passages 230 whence it will pass into the expansion chamber 50 after having unseated valves 232. At each side of recoil cylinder 220 is a plunger cylinder 234 in each of which is slidably mounted a plunger 235 having within it a portion of the long plunger spring 236 that extends to the rear end of the gun and is prevented from buckling outside the plunger by a guide rod 237 inside the spring. The plunger cylinders are connected to recoil cylinder 220 by ports 238 that are in communication with the annular groove 239 in cylinder 220, the cut-away portions 240 in the inner face of cylinder 220 being continuous with groove 239. In the forward end of each plunger cylinder is a recess 241 that serves as a dash pot to lessen the impact of the carrier against the breech housing when the plungers are returned by springs 236, the pressures in the two dash pots being equalized by a pipe 258 that connects them together. Yoke 242 is connected to both of the plungers 235 at their outer ends and to carrier 219 by a spring pressed plunger 243 disposed in recess 244 in the carrier, the plunger 243 having a square face 245 to engage the wall of opening 246 in the plunger yoke and being held against rotation in recess 244 by pin 247 that extends into a longitudinal slot in plunger 243. Carrier 119 is moved back by engagement of the rear edge of yoke 242 against face 119' on the carrier.

As barrel 47 is moved back by the recoil, piston 219 is also moved back, being connected to the barrel through piston rod 218 and yoke 77. Pressure is thus applied to the oil in cylinder 220 back of piston 219 which unseats valve 222 and allows the oil to flow through port 229 into the space forward of the piston, the motion of the piston moving throttling tube 221 over throttling rod 225 and so decreasing the area of the orifice through which the oil flows into the cylinder and checking the recoil. A portion of the oil back of the cylinder may be forced through port 231, passages 230 and valve 232 into the expansion chamber 50. The cross sectional area of piston rod 218 is equal to the combined cross sectional areas of the plunger cylinders. Thus a quantity of oil sufficient to fill the space left by the rearward movement of the plungers as the plungers are moved through the recoil distance due to their connection to the carrier through the plunger yoke 242 is caused to pass into the plunger cylinders through being displaced by the piston rod. This prevents the sharp blow that would result if the plunger cylinders remained empty until oil is forced into them by forward movement of the piston.

When recoil spring 80 returns the gun to battery, piston 219 is simultaneously moved forwardly and the oil in cylinder 220 in front of the piston is placed under pressure and valve 222 is seated after the piston has traveled a sufficient distance to clear the valve from bolt 226, thus preventing movement of oil through the throttling tube to the rear portion of the cylinder. Piston 219 has on its lower forward portion a passage 248, which decreases in cross section rearwardly, through which the oil passes to annular groove 239 through port 238 to the plunger cylinders, the volume of the plunger cylinders being substantially the same as that part of the volume of the forward portion of cylinder 220 that is not occupied by piston rod 218, when the piston is in its recoil position, and thus the return of piston 219 to its forward position forces just enough oil into the plunger cylinders to move the plungers the desired distance. It is apparent that as piston 219 moves forward, the space in passage 248 through which the oil may go into groove 239 diminishes and hence there is effected a throttling action that checks the movement of the barrel as it returns to battery. The valve stroke adjusting bolt 226 may be set to hold valve 222 open for any part of the return movement of the piston to entrap the correct quantity of oil in front of the piston to supply the plunger cylinders. If the pressure in front of the piston becomes excessive after the piston has moved forwardly of port 251, some of the oil will pass from cut-away portion 240, through port 249, unseat valve 250 and pass to the rear portion of the cylinder, back of the piston, through port 251 (Fig. 5).

Forcing the oil from cylinder 220 into the plunger cylinders drives back the plungers 235 with their connecting yoke 242 and since the yoke is connected to carrier 219, the carrier is also moved back which extracts the spent case from chamber 67, ejects it from the gun and operates the cocking mechanism. When piston 219 has reached the forward end of the cylinder, thus uncovering groove 240, the energy stored up in plunger springs 236 drives the carrier forward and rams a loaded cartridge into the chamber, the oil from the plunger cylinders returning to cylinder 220 through ports 238, annular groove 239 and the cut-away portion 240.

The recoil movement of carrier 219 is stopped by the buffer mechanism, comprising a chamber 252 mounted in back plate 49 which has a U-shaped recess to receive the buffer mechanism. A plunger 253 is slidable in a cylinder 254 that has openings in its lower side through which oil may pass from chamber 252 into cylinder 254 back of plunger 253, the inlet of oil being at the bottom to insure the presence of oil in cylinder 254 so long as any oil is contained in chamber 252. A passage 255 is provided in the upper forward portion of cylinder 254 to permit the escape of any oil or air that may be trapped in front of the piston 256 on the rear end of plunger 253. A striking plate 257 is mounted on carrier 219 to contact plunger 253, the plunger being moved forwardly by spring 277. The buffer does not function except in case the quantity of oil forced into the plunger cylinders is in excess of that required to move the carrier the proper distance.

It is sometimes desirable to retract the carrier 119 and the associated breech mechanism. For this purpose we have provided a crank 259 connected to a shaft 260 mounted on rear plate 49, the shaft having a drum 261 at its lower end. A wire 262 is wound a number of times around drum 261 and runs over a sheave 263 mounted on the slide by means of a bracket 264. The ends of the wire are secured to blocks 265 and 266 that are connected together by a spring 267. The end of the wire that is connected to block 265 passes between the limbs of a bifurcated lug 268 on plunger yoke 242 and the other end passes through a guide 269. When crank 259 is rotated in one direction, the engagement of block 265 with lug 268 draws back yoke 242 and slide 119 connected thereto; turning the crank in the opposite direction leaves the carrier free to return to the breech closed position.

The barrel 47 is cooled by passing running water in through the opening 61 where it circulates through space 74 around the chamber, out through aperture 75 to the space 269 around the barrel in the forward end of the slide, thence through passages 270 and 271 around the forward bearing and into water jacket 56 and out through the passage 62.

Operation

Two magazines 200 filled with cartridges are placed in cradle 48, the cradle being swung to position one of the magazines above the slot 85 in the feed plate 82. The placing of the magazines in the cradle releases the retainers 210 and 212 that hold the cartridges in the magazine, as above described. The carrier 119 and breech block 132 associated therewith are moved backwardly either by means of crank 259 and wire 262 connected thereto or by a threaded rod inserted through aperture 272 in rear plate 49 and engaged with the threaded boss 103 on the breech housing. As the breech housing is moved back by the latter means, the recoil piston 219 is also moved back, oil is passed through throttling tube 221 and port 229 to the forward end of the recoil cylinder 220 whence it is forced into plunger cylinder 234 upon release of the breech housing to return forwardly, thereby driving plungers 235 rearwardly which, through yoke 242 moves the carrier 119, breech block 132, etc., to the rear.

As the carrier assembly moves backwardly, the limbs of extractor 140 spread cams 114 outwardly, the cams being moved in again by springs 115 after passage of the extractor. Continued rearward movement causes portion 190 of lever 191 to ride on the lower face of automatic cocking cam 117 which rotates shaft 185 rearwardly and with shaft 185 sear lever 183, moving the sear lever so that sear 179 can engage shoulder 184 on the sear lever to lock the sear in the cocked position; the arm 187 of lever 183 has simultaneously moved toe 188 of firing pin 121 backwardly and compressed the firing pin spring 122 where it is held under compression by the engagement of sear 179 with the sear lever. The plunger springs 236 then move the carrier assembly forwardly, the extractor 140 riding up the beveled faces 116 of cams 114 and coming into contact with the under face 99 of rear stop lever 94. If a cartridge has not been moved into the slot in feed plate 82 into contact with detent 91, the feed sear 92 will lie above arm 95 of lever 94 and prevent rotation thereof by the extractor which will thus be prevented from riding up over cams 114 and the carrier will be locked with the breech open. However, if a cartridge has been fed in the normal manner, feed sear 92 will be swung out of the path of lever 94, the lever 94 will rotate to permit the extractor 140 to pass over cams 114 and the carrier will continue to move forwardly, bringing the extractor 140 against the rim of the cartridge as shown in dotted lines in Fig. 11, the full lines showing the extractor prevented from passing over the cams 114 by rear stop lever 94. The pressure of the extractor against the cartridge case produces a force component between the case and cam surfaces 87 that retires the spring plungers 88 to release the nose of the cartridge therefrom, which permits the cartridge to move down under cam surface 87, the rim following grooves 86 and 105, which aligns the cartridge with chamber 67 into which the cartridge is rammed by breech block 132. The positioning of the cartridge in chamber 67 stops the movement of the cartridge and causes sloping face 142 of the extractor to ride up over the rim of the cartridge after which the extractor is moved into the groove adjacent the cartridge rim by extractor springs 145 and is then in position to withdraw the case when spent.

When breech block 132 is stopped by striking the breech face, carrier 119 continues to move ahead, the faces 130 bearing against faces 131 of the locking wedges 113, forcing the wedges forwardly and outwardly; the carrier moves up between the locking wedges and forces them against faces 112 of blocks 111 in the breech housing which forces the forward faces of the locking wedges firmly against faces 136 of the breech block and thus provides a positive immovable lock to prevent displacement of the breech block until the breech mechanism is moved in its entirety. The cartridge moves down arm 152 of lever 151 and rotates shaft 153 forwardly which moves lever 156 in the same sense; the carrier locking rod 157 is engaged by lever 156 and moves forwardly therewith which draws stop sear 97 into position under arm 95 of lever 94, preventing rotation of lever 94 so long as the stop sear is in that position. The stop sear will be held in locking position under rear stop lever 94 so long as arm 152 of lever 151 is kept depressed by a cartridge in chamber 67 and thus, in case of failure to extract a spent case, the carrier is locked with the breech in the open position until the case has been withdrawn from the chamber. As before described, the carrier can be locked with the breech in the open position by moving plunger 158 into engagement with loop 159 on the rear end of carrier locking rod 157.

The cartridge is fired by pulling back on trigger 164 which is connected to bar 169 by rod 163. The backward movement of bar 169 places spring 174 under compression which urges the plunger 175 outwardly. If the breech is completely closed, sear 179 will be aligned with plunger 175 and will be disengaged from shoulder 184 of sear lever 183 which will release firing pin spring 122 and allow it to drive firing pin 121 against the primer to fire the cartridge. However, if the breech has not been completely closed, the plunger 175 cannot disengage sear 179 from the sear lever and the cartridge will not be fired.

The recoil moves barrel 47 and breech housing 68 back, which compresses recoil spring 80 and through yoke 77 and piston 218 forces piston 219 back in cylinder 220, the recoil being checked by the pressure built up due to throttling tube 221 moving over throttling rod 225. Valve 222 is unseated by the pressure applied to the oil in cylinder 220 back of piston 221 and oil is permitted to flow into the forward portion of cylinder 220 through port 229, valve 222 being held open by the bolt 226 during a sufficient portion of the return movement of piston 219 to permit the return to the back portion of the cylinder of all oil in excess of that required to move plungers 235 the proper distance, after which valve 222 is seated and the oil remaining in the forward portion of cylinder 220 is forced through port 238 into plunger cylinders 234. The return movement of piston 219 and the return of the barrel to battery is effected by the energy stored in recoil spring 80.

As plungers 235 are driven to the rear, springs 236 are compressed and plunger yoke 242 moves carrier 119 to the rear. This movement of the carrier brings pin 127 into contact with the rear wall of openings 125 in the locking wedges which draws the wedges rearwardly and inwardly to the position shown in Fig. 10, thus unlocking the breech block and permitting the extractor to withdraw the spent case from the chamber. The case is drawn back along grooves 104 in members 100 and 101 until the rim is deflected downwardly by groove 106 which causes the case to be ejected from the under side of the gun. The carrier continues to move back until no more liquid is being forced into the plunger cylinders or it is stopped by striker plate 257 contacting piston 253 in the buffer. The cocking action occurs as before described by lever 191 being moved downwardly by automatic cocking cam 117. Plunger spring 236 then moves the carrier forwardly which rams another cartridge into chamber 67 and if the trigger 164 is held back, plunger 175 will be moved out by spring 174 to disengage sear 179 from sear lever 183 as soon as the breech is completely closed and the sear is aligned with plunger 175, as is the case in automatic fire, the sloping lateral face of the carrier acting as a cam over which plunger 175 rides until it is aligned with the sear. If trigger 164 is released, spring 165 moves trigger rod 163 and bar 169 connected thereto forwardly, which brings cam face 177 on bar 169 in contact with yoke 178 and moves plunger 175 backward so it cannot disengage sear 179 from sear lever 183 and thus prevents firing of the cartridge.

As soon as a magazine is emptied, the trip plate 204 moves cradle latch 205 out of engagement with the cradle. The pressure on the lowermost cartridge in the loaded magazine due to springs 201 applied to the inwardly sloping ribs 83 and 84 has a component directed toward the slot 85 in the feed plate which swings cradle 48 on its trunnions and positions the loaded magazine above the slot in the feed plate where it is locked by cradle latch 205. Thus it is necessary only to replace the empty magazines with loaded ones and the cradle 48 will automatically swing into position to feed the cartridge from a loaded magazine in cradle 48 as soon as the other magazine is emptied. If at any time it is necessary to recock the gun while the breech is closed, bar 192 is pulled backwardly which draws the recocking rod 193 back, brings hook 194 thereon into engagement with lever 195, and by means of lever 197 moves the cocking lever 191 downwardly and thus rotates sear lever 183 to retract the firing pin and compress the firing pin spring.

Some of the numerous advantages inhering in our gun and not found in others are:

An ammunition supply that permits continuous fire without interruption for changing magazines or feeding in new belts so disposed that, in combination with the bottom ejection of the spent cases, makes it feasible to operate several guns side by side in the same mount.

A means of bringing the loaded cartridge into line with the axis of the gun without employing moving fingers or pawls.

Breech block locking wedges that have but slight movement, and that in opposite directions, whereby their accelerating forces annul each other and have no detrimental vibratory effect on the operation of the gun.

Means to lock the breech mechanism open when the ammunition supply is exhausted or if the spent case is not extracted when the breech is opened.

Means for stopping the gun with the breech either open or closed and for resuming automatic operation from either of these positions.

Means to delay the manual opening of the breech in case of a hang-fire or a misfire.

Direct cooling of the chamber by circulating water.

It will be understood that the above description and accompanying drawings comprehend only the general and preferred embodiment of our invention, and that various changes in construction, proportion and arrangement of parts may be made within the scope of the appended claims without sacrificing any of the advantages of this invention.

We claim:

1. In a machine gun, a barrel having in it a cartridge chamber, a slide in which said barrel is slidably mounted, a breech housing connected to the rear end of said barrel and having spaced apart portions extending rearwardly, a feed plate secured to said slide having in it a slot disposed above the space between said portions, upwardly concave ribs on each side of said feed plate tilted toward said slot to guide a cartridge toward said slot, the forwardmost of said ribs on each side of the slot being higher than the other, there being a groove in the inner face of each of said portions to guide the rim of a cartridge toward said chamber and a groove connected to each of the aforesaid grooves to guide a spent case out of the under side of the gun, a rib on each of said portions to guide the nose of a cartridge toward said chamber, a magazine cradle swingably mounted above said feed plate, two magazines supported by said cradle, cartridges contained within said magazines, means to lock said cradle in position to feed the cartridges from one of said magazines into said slot, the lowermost cartridge in the other magazine bearing on said ribs adjacent thereto and means automatically to release said lock when the one magazine is empty whereby the pressure of the cartridge in the other magazine against said ribs can swing said other magazine into feeding position over said slot.

2. In a machine gun, a barrel having in it a cartridge chamber, a slide in which said barrel is slidably mounted, a breech housing connected to the rear end of said barrel and having spaced apart portions extending rearwardly, a feed plate secured to said slide having in it a slot disposed above the space between said portions, upwardly concave ribs on each side of said feed plate tilted toward said slot to guide a cartridge toward said slot, the forwardmost of said ribs on each side of the slot being higher than the other, there being a groove in the inner face of each of said portions to guide the rim of a cartridge toward said chamber and a groove connected to each of the aforesaid grooves to guide a spent case out of the under side of the gun, and a rib on each of said portions to guide the nose of a cartridge toward said chamber.

3. In a machine gun, a barrel having in it a cartridge chamber, breech mechanism operatively related to said barrel, a longitudinally slotted feed plate through which cartridges are passed to be fed into said chamber, spring pressed plungers disposed to support the nose of a cartridge when in the slot in said feed plate, a swingably mounted detent mounted in said plate to extend into said slot when no cartridge is in said slot but movable out of said slot by a cartridge therein and means coacting with said detent to lock said breech mechanism in the open position if opened when no cartridge is in said slot.

4. In a machine gun, a barrel having in it a cartridge chamber, a magazine cradle adapted to contain two magazines swingably mounted above said barrel adjacent the breench thereof, a cradle latch to lock said cradle in position to feed cartridges from a magazine therein into said chamber, a magazine in said cradle, resilient means in said magazine to move cartridges out of the magazine, a push plate carried by said resilient means interposed between said means and the uppermost cartridge therein, a plate carried by said push plate to release said cradle latch when the magazine is empty, means to retain cartridges in the magazine when the magazine is not in the cradle, means carried by said cradle to release said cartridge retaining means when the magazine is placed in the cradle, and means coacting with the lowermost cartridge in a magazine not in the feeding position whereby the pressure of said resilient means on the cartridges in that magazine will swing said magazine into the feeding position when said cradle latch is released.

5. In a machine gun, a magazine comprising a casing open at its lower end, a plurality of bowed springs therein having their ends connected in pairs and the mid-point of each spring connected to the adjacent spring of the pair next thereto, a push plate secured to the lowermost spring, a plate on the forward end of said push plate, a resilient member secured to the rear wall of said casing having a portion adapted to engage the rim of the lowermost cartridge in the casing, a resilient member secured to each side wall adjacent the forward end of the casing and having an overturned portion to underlie the nose of said lowermost cartridge, a pin secured to each of said last mentioned resilient members adapted to pass through a hole in the casing wall, an apertured plate slidably mounted against the exterior face of each side wall movable to align the aperture therein with the said hole in the casing wall and means normally holding the aperture in said plate out of alignment with the aperture in the casing wall.

6. In a machine gun, a barrel, a breech block movable toward and away from the breech thereof having a hole therethrough to accommodate a firing pin, adjacent its forward end a groove across its upper face and down the sides thereof, opposed obtusely V-shaped grooves in upper and lower rearwardly extending portions and two faces adjacent said V-shaped grooves intersecting at substantially the angle of said V-shaped grooves; locking blocks each having a face sloping inwardly and rearwardly mounted adjacent the position of said faces on the breech block when the block is in the closed position; a carrier slidably mounted adjacent said breech block having a forward portion with an obtusely V-shaped end; locking wedges mounted on said carrier for both pivotal and sliding movement, each of said wedges having a portion extending into the grooves in the upper and lower rearwardly extending portions of the breech block and faces to coact with the said faces on the breech block, the forward end of said carrier and the face on a locking block whereby forward movement of the carrier after the breech block has been stopped will wedge the said wedges positively between said locking blocks and said breech block with the said forward portion of the carrier between said locking wedges, a substantially horseshoe shaped extractor seated in the said groove adjacent the forward end of the breech block, resilient means normally to hold said extractor down upon the breech block, means to move said carrier and breech block toward and away from the breech of said barrel and a firing pin mounted in said carrier and said breech block.

7. In a machine gun, a barrel, a breech block movable toward and away from the breech thereof, locking wedges mounted for pivotal and longitudinal movement to lock said breech block positively in the closed position, a slidable carrier upon which said wedges are mounted adapted to move said wedges into the locking position and to lie between said wedges when locked, said wedges forming an operative connection between the carrier and the breech block, a firing pin mounted in said carrier and passing through said breech block, resilient means to urge said firing pin forwardly, means to move said firing pin rearwardly to compress said resilient means, means to lock said firing pin to hold said resilient means under compression, means to release said locking means and means to move said carrier and breech block toward and away from said breech.

8. In a machine gun, a barrel, a breech block movable toward and away from the breech thereof, and means to lock said breech block in the closed position comprising a locking block disposed laterally and rearwardly of each side of said breech block when in the closed position, each of said locking blocks having an inwardly and rearwardly sloping forward face, locking wedges mounted for pivotal and longitudinal movement having portions engaged with said breech block and faces to coact with the said faces on the locking blocks and faces on the breech block and a carrier on which said wedges are mounted adapted to move said wedges into the locking position and to lie between parts of said wedges when in that position.

9. In a machine gun, a barrel, a breech block movable toward and away from said barrel, an extractor carried by said breech block having legs extending down the sides of the block and a portion over the top of said block, there being a backwardly sloping face on the forward side of the lower end of each of said legs, a cam in the path of each of said extractor legs adapted to be moved out of said path by said legs during backward movement but not during forward movement of said legs and having a rearwardly sloping face over which said face on the extractor leg is adapted to ride in normal operation, means to position cartridges to be rammed into said barrel, a detent disposed to be movable into the path of a cartridge in said means and to be displaceable therefrom by a cartridge in said means, a rotatably mounted shaft upon which said dentent is carried, a sear mounted on said shaft, a stop lever pivotally mounted above said cams having an arm disposed to be raised by said extractor as the extractor rises over said cams in normal operation, said sear being movable to prevent rotation of said arm of the stop lever when no cartridge is in position to move said detent out of said path whereby the extractor is prevented from rising over said cams and the breech block is prevented from moving into the closed position against said barrel.

10. In a machine gun, a barrel, a breech block movable toward and away from said barrel, means to position a cartridge to be rammed into said barrel, a cam disposed to extend toward each side of the path of travel of said breech block rearwardly of the closed position of said block, a member engaged with said breech block to be upwardly slidable thereon in normal operation to to rise over said cams but to engage said cams if prevented from rising thereover, a lever pivoted to be moved by said member when so rising over the said cams and means to prevent such movement of the lever when no cartridge is in position to be rammed into said barrel whereby the breech block is prevented from moving to the closed position when no cartridge is so positioned.

11. In a machine gun, a barrel, a breech block movable toward and away from said barrel, an extractor carried by said breech block having legs extending down the sides of the block and a portion over the top of said block, there being a backwardly sloping face on the forward side of the lower end of each of said legs, a cam in the path of each of said extractor legs adapted to be moved out of said path by said legs during backward movement but not during forward movement of said legs and having a rearwardly sloping face over which said face on the extractor leg is adapted to ride in normal operation, a stop lever pivotally mounted above said cams having an arm disposed to be raised by said extractor as the extractor rises over said cams in normal operation, a stop sear mounted to be movable to prevent raising of said arm by the extractor, means normally holding said stop sear away from said stop lever, an anti-double loading lever pivotally mounted with an arm disposed to be depressed by a cartridge case in said barrel and means connecting said anti-double loading lever to draw said stop sear into position to prevent movement of the stop lever when the said arm is depressed whereby the return of the breech block to the closed position is prevented when a cartridge case is in the barrel while the breech block is in the open position.

12. In a machine gun, a barrel, a breech block movable toward and away from said barrel, means to position a cartridge to be rammed into said barrel, a cam disposed to extend toward each side of the path of travel of said breech block rearwardly of the closed position of said block, a member engaged with said breech block to be upwardly slidable thereon in normal operation to rise over said cams but to engage said cams if prevented from rising thereover, a lever pivoted to be moved by said member when so rising over said cams and means to prevent such movement of the lever when a cartridge case is in the barrel while the breech block is in the open position.

13. In a machine gun, a barrel, a breech block movable toward and away from said barrel, a cam extending toward each side of the path of movement of said breech block, a member engaged with said breech block and movable with respect thereto to ride over said cams in normal operation but to engage said cams when prevented from so moving, a stop lever pivotally mounted above said cams having an arm disposed to be moved by said member as it rides over said cams but to prevent said member from riding over said cams if not so moved, a stop sear movable to prevent movement of said arm by said member, means normally holding said sear away from said stop lever and manually operable means to move said stop sear into position to prevent movement of said arm of the stop lever by said member whereby said breech block may be held in the open position.

14. In a machine gun, a barrel, a breech block and a carrier operatively connected together for movement toward and away from said barrel, a firing pin slidably mounted in said carrier and breech block, a toe projecting from the rear end of said firing pin, a spring mounted to be compressed by backward movement of said firing pin in said carrier, a sear lever pivotally mounted in said carrier having an arm disposed to bear against said toe to move said firing pin backwardly when said lever is rotated on its pivot and a second arm at an angle thereto with a portion having an arcuate edge having a notch in it, a spring pressed sear disposed to be moved into said notch when the said lever is rotated on its pivot to hold said firing pin in the cocked position, a pivot upon which said lever is mounted, a cocking lever on said pivot, a cam over which said cocking lever rides to rotate said sear lever to move said firing pin to the cocked position, means manually operable from the exterior of the gun to move said sear lever to the cocked position, a spring pressed plunger mounted in a member connected to said barrel to be aligned with said sear when the breech is closed, a yoke connected to said plunger to move said plunger outwardly to an inoperative position or inwardly to release said sear from said sear lever, a bar passing through said yoke and slidably mounted on a fixed member, said bar having on it a cam face slidable against said yoke to move said plunger into the sear releasing position and a second cam face on its opposite edge to move said plunger outwardly to the inoperative position to permit the breech block to be moved away from said barrel, and a trigger connected to said bar to move said bar to move either of said cam faces against said yoke.

15. In a machine gun, a slide, a reservoir for liquid on said slide, a barrel slidably mounted in said slide; a cylinder secured to said slide, the inner face of said cylinder wall having in it an annular groove, a rearwardly extending groove at each side adjacent the lowermost portion of said wall continuous with said annular groove, a transversely extending groove in the uppermost portion of said wall connected to said reservoir by a plurality of passages and laterally disposed ports opening through said wall from said annular groove; spring pressed valves in said reservoir to control each passage from said transversely extending groove to said reservoir, each of said valves having a small passage therethrough; a hollow piston in said cylinder having an open rear end and a closed forward end and a hole through said closed end, a piston rod connected to said closed end, a yoke connected to said barrel and said rod, a throttling tube fixed in said piston, a valve disposed to seat in said throttling tube and having a stem slidable in said piston rod, a spring to urge said valve toward its seat, a forwardly tapered throttling rod fixed to the rear head of said cylinder over which said throttling tube may be moved by recoil, a bolt adjustably mounted in said throttling rod to hold said valve unseated to a predetermined point in its travel, a cylinder connected to each of said ports, a plunger in each cylinder, a spring disposed to bear against each plunger and against a member at the rear end of the gun, a yoke connected to both of said plungers, firing and breech closing mechanism for said barrel, means connecting said yoke to said mechanism and means connecting the last mentioned cylinders to equalize pressures therein.

16. In a machine gun, a slide, a barrel slidably mounted therein, a reservoir for liquid on said slide, a cylinder secured to said slide in communication with said reservoir through a plurality of passages, a spring pressed valve having a small hole therethrough disposed to control each of said passages, a piston in said cylinder having a passage through its closed forward end, a piston rod connected to said closed end, a yoke connected to said piston rod and said barrel, a throttling tube in sad cylinder, a valve disposed to seat in said throttling tube adapted to be unseated by pressure in said cylinder as said piston is moved rearwardly and having a stem slidable in said piston rod, a spring to urge said valve toward its seat, said piston having in it a rearwardly contracting throttling passage through which liquid may pass from the front end of said cylinder to a groove in said cylinder whereby the movement of said barrel to battery is checked, a pair of cylinders in communication with said groove to receive liquid therefrom, means to operate breech mechanism actuatable by liquid in said pair of cylinders and means to hold said valve unseated to meter the liquid passed to said pair of cylinders to move said breech mechanism through the proper distance.

17. In a machine gun, a barrel mounted to be slidable for recoil, a cylinder fixedly mounted with respect thereto having cut-away portions in the inner face of the cylinder wall, a hollow piston in said cylinder having in it a passage to connect the forward portion of the cylinder with said cut-away portions, means connecting said piston to said barrel, means to control passage of liquid through said piston from one end of said cylinder to the other and a spring actuated valve disposed to control by-passing of liquid from said cut-away portions to he rear end of said cylinder when the pressure in said portions exceeds a predetermined value.

18. In a machine gun, a slidably mounted barrel, firing and breech mechanism operatively related to said barrel, a hollow piston connected to said barrel, said piston having a passage therethough, means to control the flow of liquid therethrough and a throttling passage extending backwardly from the forward end thereof; a cylinder in which said piston is slidable, said cylinder having in its inner face an annular groove and ports opening into said groove, said groove being in communication with the throttling passage in said piston except when the barrel is in battery, a plunger cylinder connected to each of said ports, a plunger in each plunger cylinder adapted to be moved backwardly by liquid forced into said plunger cylinders through said ports, a spring connected to each plunger to be compressed by rearward movement of said plunger, and means connecting said plungers to said breech mechanism whereby said mechanism is moved rearwardly by said plungers and forwardly by said springs.

19. In a machine gun, a slidably mounted barrel, firing and breech closing mechanism operatively related thereto, a spring connected to said barrel to be compressed by recoil of the barrel, a cylinder fixedly mounted adjacent said barrel, a hollow piston in said cylinder having a closed end with an aperture therethrough, a piston rod connected to said piston and said barrel, a valve in said piston adapted to be unseated by liquid pressure as said piston is moved rearwardly and to be unseated on reverse movement of the piston, a pair of plunger cylinders connected to the aforesaid cylinder, a plunger in each of said plunger cylinders, the combined cross sectional area of said plunger cylinders being equal to that of said piston rod whereby rearward movement of sad piston will force into said plunger cylinders sufficient liquid to move said plungers the same distance as said piston moves, means to hold said valve unseated to provide the proper quantity of liquid ahead of said piston to move said plungers rearwardly the proper distance to operate said breech mechanism when said spring returns the barrel to battery and means to store energy during the rearward movement of said plungers to return said breech mechanism forwardly.

20. In a machine gun, a barrel, a slide in which said barrel is mounted for longitudinal movement relative thereto, a breech housing connected to said barrel, firing and breech closing mechanism slidably mounted in said housing, said firing mechanism including a firing pin and means to move said firing pin to the cocked position, a sear to hold said firing pin in the cocked position, a resiliently actuated plunger mounted in said housing to be aligned with said sear to release said firing pin when the breech is closed, said plunger being movable to an operative position to release said sear and to lock said breech mechanism against opening and also to an inoperative position, a yoke connected to said plunger to move the plunger to either of said positions, a bar carried by said slide and slidable through said yoke having a cam face on its inner edge adapted to contact said yoke to move said plunger into said operative position and a second cam face on its outer edge adapted to contact said yoke to move said plunger into the said inoperative position, the said yoke being moved over said second cam by the recoil of the breech housing, a trigger connected to said bar and a member in which said trigger is slidable having an L-shaped slot into which the trigger must be moved to slide said bar forwardly, whereby said plunger cannot be moved into the inoperative position to open said breech manually until said trigger has been rotated and slid into said slot.

21. In a machine gun, a barrel, firing and breech closing mechanism mounted in operative relation to said barrel, said firing mechanism including a firing pin and means to move said firing pin to the cocked position, means to retain said firing pin in the cocked position, an element movable to operative position to release said retaining means and to lock the breech closing mechanism against opening and also movable to an inoperative position, a member connected to said element, a bar slidable through said member having a cam on one edge to contact said member to move said element to the operative position and a second cam on the opposite edge to move said element to the inoperative position, the said member being movable over said second cam by the recoil of a member connected to said barrel, a trigger connected to said bar and a member in which said trigger is slidable, said member having in it an L-shaped slot into which said trigger must be moved to slide said bar forwardly, whereby said element cannot be moved into the inoperative position for opening the breech manually until said trigger has been rotated and slid into said slot.

22. In a machine gun, a barrel, firing and breech closing mechanism operatively related thereto, means to release the firing mechanism and to lock said breech closing mechanism against manual opening, a trigger connected to said means, and a member in which said trigger is slidable, said member having in it an L-shaped slot into which said trigger must be rotated and slid to move said means to permit manual opening of said breech.

GEORGE A. CHADWICK.
PAUL W. BURK.

REFERENCES CITED

The following references are of record in the file of this patent:

UNITED STATES PATENTS

| Number | Name | Date |
|---|---|---|
| 35,877 | Hursh | July 15, 1862 |
| 305,050 | Cook | Sept. 16, 1884 |
| 439,248 | Maxim | Oct. 28, 1890 |
| 522,508 | Canet | July 3, 1894 |
| 579,401 | Maxim | Mar. 23, 1897 |
| 642,018 | Ternstrom | Jan. 23, 1900 |
| 710,094 | Browning | Sept. 30, 1902 |
| 781,503 | Driggs | Jan. 31, 1905 |
| 802,033 | Freeman | Oct. 17, 1905 |
| 802,279 | Frommer | Oct. 17, 1905 |
| 804,986 | Stamm | Nov. 21, 1905 |
| 870,719 | Freeman | Nov. 12, 1907 |
| 944,930 | Whiting | Dec. 28, 1909 |
| 1,096,679 | Chronis | May 12, 1914 |
| 1,140,245 | Bubar | May 18, 1915 |
| 1,343,444 | Formby | June 15, 1920 |
| 1,346,012 | Fairfax | July 6, 1920 |
| 1,396,949 | Eickhoff | Nov. 15, 1921 |
| 1,446,635 | Berthier | Feb. 27, 1923 |
| 1,453,439 | Cedillo | May 1, 1923 |
| 1,695,508 | Skinner | Dec. 18, 1928 |
| 1,709,162 | Westervelt | Apr. 16, 1929 |
| 1,709,399 | Herlach | Apr. 16, 1929 |
| 1,786,207 | Hudson | Dec. 23, 1930 |
| 1,805,383 | Thiry | May 12, 1931 |
| 2,026,528 | Green | Jan. 7, 1936 |
| 2,112,660 | Hudson | Mar. 29, 1938 |

FOREIGN PATENTS

| Number | Country | Date |
|---|---|---|
| 14,261 | Great Britain | 1891 |
| 56,872 | Germany | May 30, 1891 |
| 275,149 | Germany | June 10, 1914 |
| 291,387 | Germany | Apr. 15, 1916 |
| 304,510 | Great Britain | Jan. 24, 1929 |
| 582,097 | Germany | Aug. 8, 1933 |
| 610,258 | Germany | Mar. 6, 1935 |